(12) United States Patent
Saber et al.

(10) Patent No.: US 11,638,143 B2
(45) Date of Patent: Apr. 25, 2023

(54) BLIND DETECTION AND CONTROL CHANNEL ELEMENT MONITORING LIMITS IN CARRIER AGGREGATION

(71) Applicant: Samsung Electronics Co., Ltd., Suwon-si (KR)

(72) Inventors: Hamid Saber, San Diego, CA (US); Jung Hyun Bae, San Diego, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 89 days.

(21) Appl. No.: 17/062,498

(22) Filed: Oct. 2, 2020

(65) Prior Publication Data
US 2021/0282001 A1 Sep. 9, 2021

Related U.S. Application Data

(60) Provisional application No. 63/081,125, filed on Sep. 21, 2020, provisional application No. 63/025,779, (Continued)

(51) Int. Cl.
*H04W 8/24* (2009.01)
*H04W 24/08* (2009.01)
(Continued)

(52) U.S. Cl.
CPC .............. *H04W 8/24* (2013.01); *H04W 24/08* (2013.01); *H04W 72/042* (2013.01); *H04L 5/001* (2013.01)

(58) Field of Classification Search
CPC ..... H04L 5/001; H04L 5/0053; H04L 5/0094; H04W 24/08; H04W 72/042; H04W 8/24; H04W 8/22
See application file for complete search history.

(56) References Cited

U.S. PATENT DOCUMENTS

2019/0335488 A1 10/2019 Xiong et al.
2020/0146064 A1* 5/2020 Oh .................... H04W 72/1289
(Continued)

FOREIGN PATENT DOCUMENTS

| CN | 110351041 A | 10/2019 |
|----|-------------|---------|
| CN | 111093270 A | 5/2020 |
| WO | WO 2020/032774 A1 | 2/2020 |

OTHER PUBLICATIONS

Huawei, et al.: "Corrections on PDCCH enhancement for URLLC," R1-2001023, 3rd Generation Partnership Project (3GPP), 2020, 15 pages, Retrieved from the Internet: URL:https://ftp.3gpp.org/tsg_ran/WG1_RL1/TSGR1_100_e/Docs/R1-2001023.zip [retrieved on Feb. 15, 2020].

(Continued)

*Primary Examiner* — Stephen J Clawson
(74) *Attorney, Agent, or Firm* — Lewis Roca Rothgerber Christie LLP

(57) ABSTRACT

A system and method for setting blind detection and control channel element monitoring limits in a carrier aggregation scheme. In some embodiments, the method includes: receiving, by a network from a first user equipment (UE), a declaration of capabilities of the first UE; sending, by the network, to the first UE, a first search space (SS) configuration for a first component carrier in a carrier aggregation (CA) scheme; and sending, by the network, to the first UE, a second search space configuration for a second component carrier in the carrier aggregation scheme. The first search space configuration may define a first set of monitoring occasions, the second search space configuration may define a second set of monitoring occasions (MOs), and an aligned span pattern, corresponding to the first set of monitoring occasions and the second set of monitoring occasions, may comply with the declaration of capabilities of the first UE.

16 Claims, 22 Drawing Sheets

Related U.S. Application Data filed on May 15, 2020, provisional application No. 63/000,049, filed on Mar. 26, 2020, provisional application No. 62/985,181, filed on Mar. 4, 2020.

(51) Int. Cl.
*H04W 72/04* (2023.01)
*H04L 5/00* (2006.01)

(56) References Cited

U.S. PATENT DOCUMENTS

| | | | |
|---|---|---|---|
| 2020/0329389 A1* | 10/2020 | Hosseini | H04L 5/0053 |
| 2020/0351644 A1* | 11/2020 | Yang | H04W 72/0446 |
| 2020/0389874 A1* | 12/2020 | Lin | H04W 72/042 |
| 2021/0007066 A1* | 1/2021 | Lin | H04L 1/0061 |
| 2021/0037607 A1* | 2/2021 | Hamidi-Sepehr | H04L 5/001 |
| 2021/0112432 A1* | 4/2021 | Yang | H04W 72/042 |
| 2021/0360593 A1* | 11/2021 | Hosseini | H04L 5/0094 |
| 2022/0329399 A1* | 10/2022 | Kittichokechai | H04L 5/0053 |

OTHER PUBLICATIONS

Intel Corporation: "Remaining aspects on Rel-16 PDCCH enhancements for URLLC," R1-2000735, 3rd Generation Partnership Project (3GPP), 2020, 20 pages, Retrieved from the Internet: URL:https://ftp.3gpp.org/tsg_ran/WG1_RL1/TSGRI_100_e/Docs/R1-2000735.zip [retrieved on Feb. 15, 2020].

QUALCOMM: "Remaining Issues on PDCCH Enhancements for URLLC," R1-2000968, 3rd Generation Partnership Project (3GPP), 2020, 10 pages, Retrieved from the Internet: URL:https://ftp.3gpp.org/tsg_ran/WG1_RL1/TSGRI1_100_e/Docs/R1-2000968.zip [retrieved on Feb. 15, 2020].

ZTE: "Remain issues on PDCCH enhancements for NR URLLC," R1-2000355, 3rd Generation Partnership Project (3GPP), 2020, 9 pages, Retrieved from the Internet: URL:https://ftp.3gpp.org/tsg_ran/WG1_RL1/TSGR1_100_e/Docs/R1-2000355.zip [retrieved on Feb. 15, 2020].

EPO Extended European Search Report dated May 26, 2021, issued in corresponding European Patent Application No. 20215001.7 (12 pages).

* cited by examiner

| Index | Feature group | Components | Field name in TS 38.331 |
|---|---|---|---|
| 3-5b | All PDCCH monitoring occasion can be any OFDM symbol(s) of a slot for Case 2 with a span gap | PDCCH monitoring occasions of FG-3-1, plus additional PDCCH monitoring occasion(s) can be any OFDM symbol(s) of a slot for Case 2, and for any two PDCCH monitoring occasions belonging to different spans, where at least one of them is not the monitoring occasions of FG-3-1, in same or different search spaces, there is a minimum time separation of X OFDM symbols (including the cross slot boundary case) between the start of two spans, where each span is of length up to Y consecutive OFDM symbols of a slot. Spans do not overlap. Every span is contained in a single slot. The same span pattern repeats in every slot. The separation between consecutive spans within and across slots may be unequal but the same (X, Y) limit must be satisfied by all spans. Every monitoring occasion is fully contained in one span. In order to determine a suitable span pattern, first a bitmap b(l), 0<=l<=13 is generated, where b(l)=1 if symbol l of any slot is part of a monitoring occasion, b(l)=0 otherwise. The first span in the span pattern begins at the smallest l for which b(l)=1. The next span in the span pattern begins at the smallest l not included in the previous span(s) for which b(l)=1. The span duration is max{maximum value of all CORESET durations, minimum value of Y in the UE reported candidate value} except possibly the last span in a slot which can be of shorter duration. A particular PDCCH monitoring configuration meets the UE capability limitation if the span arrangement satisfies the gap separation for at least one (X, Y) in the UE reported candidate value set in every slot, including cross slot boundary. For the set of monitoring occasions which are within the same span:<br>• Processing one unicast DCI scheduling DL and one unicast DCI scheduling UL per scheduled CC across this set of monitoring occasions for FDD<br>• Processing one unicast DCI scheduling DL and two unicast DCI scheduling UL per scheduled CC across this set of monitoring occasions for TDD<br>• Processing two unicast DCI scheduling DL and one unicast DCI scheduling UL per scheduled CC across this set of monitoring occasions for TDD<br>The number of different start symbol indices of spans for all PDCCH monitoring occasions per slot, including PDCCH monitoring occasions of FG-3-1, is no more than floor(14/X) (X is minimum among values reported by UE).<br>The number of different start symbol indices of PDCCH monitoring occasions per slot including PDCCH monitoring occasions of FG-3-1, is no more than 7. The number of different start symbol indices of PDCCH monitoring occasions per half-slot including PDCCH monitoring occasions of FG-3-1 is no more than 4 in SCell. | pdcch-MonitoringAnyOccasionsWithSpanGap (X, Y):<br>set1 = (7, 3),<br>set2 = (4, 3) and (7,3),<br>set3 = (2, 2), (4, 3) and (7, 3). |

FIG. 1A

| Index | Feature group | Components | Field name in TS 38.331 |
|---|---|---|---|
| 3-1 | Basic DL control channel | 1) One configured CORESET per BWP per cell in addition to CORESET0<br>- CORESET resource allocation of 6RB bit-map and duration of 1-3 OFDM symbols for FR1<br>- For type 1 CSS without dedicated RRC configuration and for type 0, 0A, and 2 CSSs, CORESET resource allocation of 6RB bit-map and duration 1-3 OFDM symbols for FR2<br>- For type 1 CSS with dedicated RRC configuration and for type 3 CSS, UE specific SS, CORESET resource allocation of 6RB bit-map and duration 1-2 OFDM symbols for FR2<br>- REG-bundle sizes of 2/3 RBs or 6 RBs<br>- Interleaved and non interleaved CCE-to-REG mapping<br>- Precoder-granularity of REG-bundle size<br>- PDCCH DMRS scrambling determination<br>- TCI state(s) for a CORESET configuration<br>2) CSS and UE-SS configurations for unicast PDCCH transmission per BWP per cell<br>- PDCCH aggregation levels 1, 2, 4, 8, 16<br>- UP to 3 search space sets in a slot for a scheduled SCell per BWP<br>This search space limit is before applying all dropping rules.<br>- For type 1 CSS with dedicated RRC configuration, type 3 CSS, and UE-SS, the monitoring occasion is within the first 3 OFDM symbols of a slot<br>- For type 1 CSS without dedicated RRC configuration and for type 0, 0A, and 2 CSS, the monitoring occasion can be any OFDM symbol(s) of a slot, with the monitoring occasions for any of Type 1-CSS without dedicated RRC configuration, or Types 0, 0A, or 2 CSS configurations within a single span of three consecutive OFDM symbols within a slot<br>3) Monitoring DCI formats 0_0, 1_0, 0_1, 1_1<br>4) Number of PDCCH blind decodes per slot with a given SCS follows Case 1-1 table<br>5) Processing one unicast DCI scheduling DL and one unicast DCI scheduling UL per slot per scheduled CC for FDD<br>6) Processing one unicast DCI scheduling DL and 2 unicast DCI scheduling UL per slot per scheduled CC for TDD | n/a |

FIG. 1B

| symbol | 0 | 1 | 2 | 3 | 4 | 5 | 6 | 7 | 8 | 9 | 10 | 11 | 12 | 13 | 0 | 1 | 2 |
|---|---|---|---|---|---|---|---|---|---|---|---|---|---|---|---|---|---|
| MO | | ▓ | | ▓ | ▓ | | | | ▓ | ▓ | | | | ▓ | | ▓ | |
| span | | | | | | | | | | | | | | | | | |
| (2,2), (4,3), (7,3) | | | | | | | | | | | | | | | | | |

Table 1

| $\mu$ | Maximum number $M^{max,(X,Y)}_{PDCCH,\mu}$ of monitored PDCCH candidates per span pattern (X, Y) and per serving cell | | |
|---|---|---|---|
| | (2, 2) | (4, 3) | (7, 3) |
| 0 | M01 | M02 | M03 |
| 1 | M11 | M12 | M13 |

FIG. 1E

Table 2

| $L$ | Maximum number $C^{max,(X,Y)}_{PDCCH,\mu}$ of non-overlapped CCEs per span pattern $(X, Y)$ and per serving cell | | |
|---|---|---|---|
| | (2,2) | (4,3) | (7,3) |
| 0 | C01 | C02 | 56 |
| 1 | C11 | C12 | 56 |

BLIND DETECTION AND CONTROL CHANNEL ELEMENT MONITORING LIMITS IN CARRIER AGGREGATION

CROSS-REFERENCE TO RELATED APPLICATION(S)

The present application claims the benefit (i) of U.S. Provisional Application No. 62/985,181, filed Mar. 4, 2020, entitled "SYSTEM AND METHOD FOR PROVIDING PDCCH MONITORING LIMIT DESIGN IN CARRIER AGGREGATION (CA) AND DUAL CONNECTIVITY (DC) BASED ON MONITORING SPAN", (ii) of U.S. Provisional Application No. 63/000,049, filed Mar. 26, 2020, entitled "PDCCH BD/CCE LIMIT DETERMINATION FOR URLLC WITH CARRIER AGGREGATION FRAMEWORK", (iii) of U.S. Provisional Application No. 63/025,779, filed May 15, 2020, entitled "PDCCH BD/CCE LIMIT DETERMINATION FOR URLLC WITH CARRIER AGGREGATION FRAMEWORK WITH SPAN PATTERN DEFINITION", and (iv) of U.S. Provisional Application No. 63/081,125, filed Sep. 21, 2020, entitled "A method of determining unaligned span for PDCCH monitoring limit in CA/DC based on monitoring span", the entire contents of all of which is incorporated herein by reference.

FIELD

One or more aspects of embodiments according to the present disclosure relate to wireless communications, and more particularly to a system and method for setting blind detection and control channel element monitoring limits in a carrier aggregation scheme.

BACKGROUND

In a wireless system, it may be advantageous for a network to be permitted to schedule physical downlink control channel (PDCCH) candidates in a manner that is flexible, without scheduling them in a manner that burdens a user equipment to an unacceptable extent. Simple limits on blind detection and control channel element monitoring may be capable of protecting the user equipment from excessively burdensome requirements, but such limits may be sufficiently inflexible to limit the performance of the network, especially in a carrier aggregation (CA) scheme.

Thus, there is a need for an improved system and method for setting blind detection and control channel element monitoring limits in a carrier aggregation scheme.

SUMMARY

According to an embodiment of the present disclosure, there is provided a method, including: receiving, by a network from a first user equipment (UE), a declaration of capabilities of the first UE; sending, by the network, to the first UE, a first search space (SS) configuration for a first component carrier in a carrier aggregation (CA) scheme; and sending, by the network, to the first UE, a second search space configuration for a second component carrier in the carrier aggregation scheme, wherein: the first search space configuration defines a first set of monitoring occasions, the second search space configuration defines a second set of monitoring occasions (MOs), and an aligned span pattern, corresponding to the first set of monitoring occasions and the second set of monitoring occasions, complies with the declaration of capabilities of the first UE.

In some embodiments, the aligned span pattern is a span pattern corresponding to the union of the first set of monitoring occasions and the second set of monitoring occasions.

In some embodiments, the total number of PDCCH candidates in the first set of monitoring occasions and the second set of monitoring occasions is at most equal to a maximum number of PDCCH candidates, the maximum number of PDCCH candidates being based on: the number of serving cells configured with span-based monitoring capability, a specified constant, and a number of downlink cells with span-based monitoring capability with which the UE is configured.

In some embodiments, the maximum number of PDCCH candidates $M_{PDCCH}^{total,(X,Y),\mu}$ is equal to $$\left\lfloor N_{cells}^{cap-r16} \times M_{PDCCH}^{max,(X,Y),\mu} \times \frac{N_{cells,r16}^{DL,(X,Y),\mu}}{\sum_{\mu} N_{cells,r16}^{DL,\mu}} \right\rfloor$$

wherein: $N_{cells}^{cap-r16}$ is the reference number of serving cells with span-based monitoring capability and is included in the declaration of capabilities of the first UE, $M_{PDCCH}^{max,(X,Y),\mu}$ is the specified constant, and $N_{cells,r16}^{DL,(X,Y),\mu}$ is the number of downlink cells with span-based monitoring capability with which the UE is configured.

In some embodiments: the first set of monitoring occasions and the second set of monitoring occasions together include a plurality of control channel elements (CCEs), and the number of control channel elements is at most equal to a maximum number of control channel elements, the maximum number of control channel elements being based on: the number of serving cells configured with span-based monitoring capability, a specified constant, and a number of downlink cells with span-based monitoring capability with which the UE is configured.

In some embodiments, the maximum number of control channel elements is equal to $$C_{PDCCH}^{total,(X,Y),\mu} = \left\lfloor N_{cells}^{cap-r16} \times C_{PDCCH}^{max,(X,Y),\mu} \times \frac{N_{cells,r16}^{DL,(X,Y),\mu}}{\sum_{\mu} N_{cells,r16}^{DL,\mu}} \right\rfloor$$

wherein: $N_{cells}^{cap-r16}$ is the reference number of serving cells with span-based monitoring capability and is included in the declaration of capabilities of the first UE, $C_{PDCCH}^{max,(X,Y),\mu}$ is the specified constant, and $N_{cells,r16}^{DL,(X,Y),\mu}$ is a number of downlink cells with span-based monitoring capability with which the UE is configured.

In some embodiments, the method further includes receiving, by the network from a second user equipment (UE), a declaration of capabilities of the second UE; sending, by the network, to the second UE, a third search space configuration for the first component carrier; and sending, by the network, to the second UE, a fourth search space configuration for the second component carrier, wherein: the third search space configuration defines a third set of monitoring occasions, the fourth search space configuration defines a fourth set of monitoring occasions (MOs), and a span pattern corresponding to the third set of monitoring occasions is not aligned with a span pattern corresponding to the fourth set of monitoring occasions.

In some embodiments, the third search space configuration includes at most $M_{PDCCH}^{total,(X,Y),\mu}$ PDCCH candidates, wherein $M_{PDCCH}^{total,(X,Y),\mu}$ is based on the declaration of capabilities of the second UE.

In some embodiments, the third search space configuration includes at most $C_{PDCCH}^{total,(X,Y),\mu}$ control channel elements, wherein $C_{PDCCH}^{total,(X,Y),\mu}$ is based on the declaration of capabilities of the second UE.

In some embodiments: the declaration of capabilities of the first UE includes: a first span-gap span-length pair, and a second span-gap span-length pair; the method further includes: determining a first span pattern for the first span-gap span-length pair and for the first set of monitoring occasions, the first span pattern being the span pattern assuming the span-gap span-length pair, that includes a first set of control resource sets and a first set of search spaces; determining that the first span pattern is valid for the first span-gap span-length pair; determining a second span pattern for the second span-gap span-length pair and for the first set of monitoring occasions, the second span pattern being the span pattern assuming the span-gap span-length pair, that includes the first set monitoring occasions; and determining that the first span pattern is valid for the first span-gap span-length pair.

In some embodiments, the method further includes: determining that the first span-gap span-length pair corresponds to a first specified constant, the first specified constant specifying a maximum number of monitored PDCCH candidates; and determining that the second span-gap span-length pair corresponds to a second specified constant, the first specified constant specifying a maximum number of monitored PDCCH candidates, the second specified constant being greater than the first specified constant.

In some embodiments, the method further includes: determining that the first span-gap span-length pair corresponds to a first specified constant, the first specified constant specifying a maximum number of non-overlapping control channel elements; and determining that the second span-gap span-length pair corresponds to a second specified constant, the first specified constant specifying a maximum number of non-overlapping control channel elements, the second specified constant being greater than the first specified constant.

In some embodiments, the method further includes: instructing, by the network, the UE to transition to a bandwidth part not supporting span-based PDCCH monitoring, and sending, by the network, to the UE, a third search space configuration, the third search space configuration being a search space configuration for slot-based PDCCH monitoring.

In some embodiments: the aligned span pattern includes: a first span pattern for the first search space configuration, and a second span pattern for the second search space configuration, and every two spans: have the same starting and ending symbols, or have a time gap, between the start of the two spans, equal to or greater than a span-gap element of a span-gap span-length pair of the declaration of capabilities of the first UE.

In some embodiments: the aligned span pattern includes: a first span pattern for the first search space configuration, and a second span pattern for the second search space configuration, and every two spans: have the same starting symbols, or have a time gap, between the start of the two spans, equal to or greater than a span-gap element of a span-gap span-length pair of the declaration of capabilities of the first UE.

In some embodiments: the aligned span pattern includes: a first span pattern for the first search space configuration, and a second span pattern for the second search space configuration, and every two spans: have the same ending symbols, or have a time gap, between the start of the two spans, equal to or greater than a span-gap element of a span-gap span-length pair of the declaration of capabilities of the first UE.

In some embodiments: the aligned span pattern includes: a first span pattern for the first search space configuration, and a second span pattern for the second search space configuration, and every two spans: have the same starting symbols, or have the same ending symbols, or have a time gap, between the start of the two spans, equal to or greater than a span-gap element of a span-gap span-length pair of the declaration of capabilities of the first UE.

In some embodiments, the method further includes: sending, by the network, a set of slots including: in a first slot of the set of slots, the aligned span pattern corresponding to the first set of monitoring occasions and the second set of monitoring occasions, and one or more unaligned slots, wherein: the longest set of consecutive aligned slots within the set of slots includes fewer than P slots, and P is a specified constant greater than 3 and less than 100.

According to an embodiment of the present disclosure, there is provided a system including a user equipment (UE), the UE including a processing circuit configured to: send, to a network, a declaration of capabilities of the UE; receive, from the network, a first search space configuration for a first component carrier in a carrier aggregation (CA) scheme; and receive, from the network, a second search space configuration for a second component carrier in the carrier aggregation scheme, wherein: the first search space configuration defines a first set of monitoring occasions, the second search space configuration defines a second set of monitoring occasions (MOs), and an aligned span pattern, corresponding to the first set of monitoring occasions and the second set of monitoring occasions, complies with the declaration of capabilities of the UE.

In some embodiments, the aligned span pattern is a span pattern corresponding to the union of the first set of monitoring occasions and the second set of monitoring occasions.

In some embodiments, the processing circuit is further configured to: receive, from the network, a third search space configuration for a third component carrier in the carrier aggregation scheme; and receive, from the network, a fourth search space configuration for a fourth component carrier in the carrier aggregation scheme, wherein: the third search space configuration defines a third set of monitoring occasions, the fourth search space configuration defines a fourth set of monitoring occasions (MOs), and an unaligned span pattern, corresponding to the third set of monitoring occasions and the fourth set of monitoring occasions, complies with the declaration of capabilities of the UE.

According to an embodiment of the present disclosure, there is provided a system including a network, the network including a processing circuit configured to: receive, from a user equipment (UE), a declaration of capabilities of the UE; send, to the UE, a first search space configuration for a first component carrier in a carrier aggregation (CA) scheme; and send, to the UE, a second search space configuration for a second component carrier in the carrier aggregation scheme, wherein: the first search space configuration defines a first set of monitoring occasions, the second search space configuration defines a second set of monitoring occasions (MOs), and an aligned span pattern, corresponding to the first set of monitoring occasions and the second set of monitoring occasions, complies with the declaration of capabilities of the UE.

In some embodiments, the aligned span pattern is a span pattern corresponding to the union of the first set of monitoring occasions and the second set of monitoring occasions.

BRIEF DESCRIPTION OF THE DRAWINGS

These and other features and advantages of the present disclosure will be appreciated and understood with reference to the specification, claims, and appended drawings wherein:

FIG. 1A is a table defining certain aspects of span-based monitoring, according to an embodiment of the present disclosure;

FIG. 1B is a table defining certain aspects of span-based monitoring, according to an embodiment of the present disclosure;

FIG. 1C is a span diagram, according to an embodiment of the present disclosure;

FIG. 1D is a span diagram, according to an embodiment of the present disclosure;

FIG. 1E is a table defining certain aspects of span-based monitoring, according to an embodiment of the present disclosure;

FIG. 1F is a table defining certain aspects of span-based monitoring, according to an embodiment of the present disclosure;

FIG. 2B is a span diagram, according to an embodiment of the present disclosure;

FIG. 2C is a span diagram, according to an embodiment of the present disclosure;

FIG. 2D is a span diagram, according to an embodiment of the present disclosure;

FIG. 2E is a span diagram, according to an embodiment of the present disclosure;

FIG. 2F is a span diagram, according to an embodiment of the present disclosure;

FIG. 2G is a span diagram, according to an embodiment of the present disclosure;

FIG. 2H is a span diagram, according to an embodiment of the present disclosure;

FIGS. 21-1 and 21-2 are a span diagram, according to an embodiment of the present disclosure;

FIG. 2J is a span diagram, according to an embodiment of the present disclosure;

FIG. 2K is a span diagram, according to an embodiment of the present disclosure;

FIG. 2M is a span diagram, according to an embodiment of the present disclosure.

DETAILED DESCRIPTION

Figure 2A:
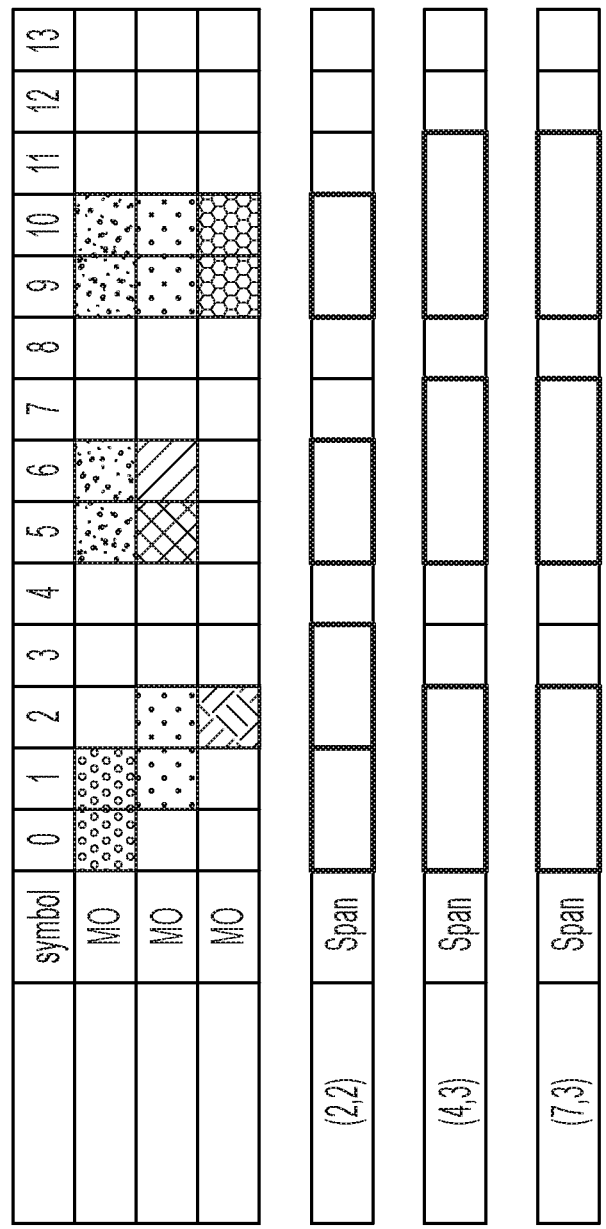
FIG. 2A is a span diagram, according to an embodiment of the present disclosure.

The detailed description set forth below in connection with the appended drawings is intended as a description of exemplary embodiments of a system and method for setting blind detection and control channel element monitoring limits in a carrier aggregation scheme provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

Figure 1D:
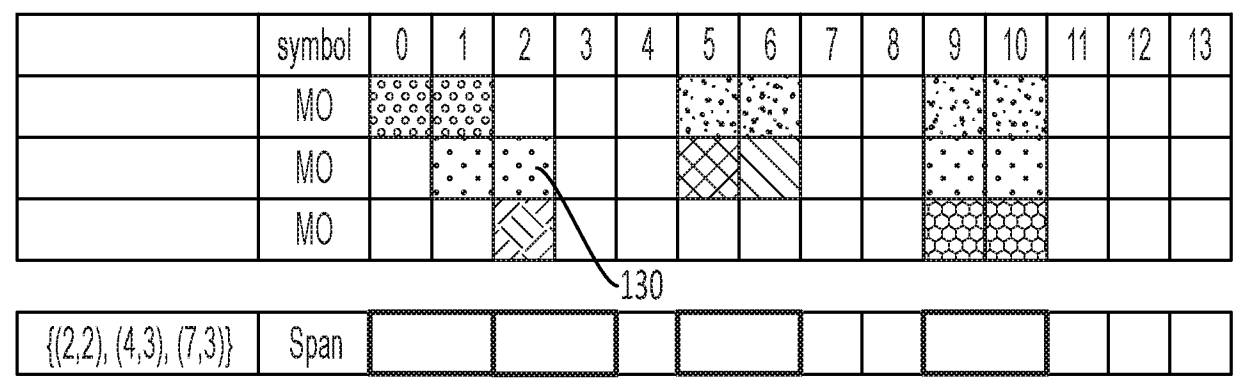

In a cellular system, a user equipment (UE) may monitor a physical downlink control channel (PDCCH) search space (SS) to obtain downlink control information (DCI) which provides control information for a UE's downlink operation. As used herein, the phrase "user equipment" is used as a countable noun even though the noun it contains ("equipment") may not be countable in ordinary English. Each time instance of a PDCCH SS may be referred to as a monitoring occasion (MO). In the new radio (NR) specification, to improve system latency and flexibility, the location of each MO can be arbitrary within a slot which consists of 14 or 12 orthogonal frequency division multiplexing (OFDM) symbols. However, such flexibility increases a UE's PDCCH monitoring complexity, and a UE capability signaling scheme which can limit the MO pattern within each slot is included in the release 15 NR specification. A network is required to provide a PDCCH SS configuration, which defines a set of monitoring occasions which satisfies the declared UE capability. The table of FIG. 1A, which is a part of the 3rd Generation Partnership Project (3GPP) specification TR 38.822, describes the corresponding capability signaling. The table of FIG. 1A refers to FG-3-1, which is reproduced in the table of FIG. 1B.

A monitoring span mentioned in FG3-5b of the table of FIG. 1A consists of consecutive symbols within a slot, and a span pattern within a slot is determined based on the monitoring occasion (MO) pattern, a monitoring capability reported by the UE as a set of ordered pairs (X,Y), and the control resource set (CORESET) configuration for the user equipment (UE). Each ordered pair of numbers (X, Y) may be referred to as a "span-gap span-length pair" (within which X is the span-gap element, and Y is the span-length element). In particular, spans within a slot have the same duration, which is determined by max{maximum value of all CORESET durations, minimum value of Y in the UE reported candidate value} except possibly the last span in a slot which can be of shorter duration. The first span in the span pattern within a slot begins at the symbol of the smallest index for which a monitoring occasion is configured to the UE. The next span begins with an MO which is not included in the first span and the same procedure is applied to construct the following spans. The separation between any two consecutive spans within and across slots must satisfy the same (X,Y) limit, where X represents the minimum time separation of OFDM symbols of two spans and Y represents the maximum number of consecutive OFDM symbols for each span. In release 15 (Rel-15), the UE can report its monitoring capability from three possible sets: {(7,3)}, {(4,3), (7,3)}, {(2,2), (4,3), (7,3)}. One example is shown in FIG. 1C, where the CORESET configuration has one symbol and the UE reports {(2,2), (4,3), (7,3)}. Smaller 'X' will make monitoring more frequent, i.e., more challenging, from the perspective of the UE. Such nested capability signaling, i.e., a signaling scheme in which, when a UE sends to the network a declaration (or a "declaration of capabilities") indicating that it is capable of supporting a certain X value, it implies that it can also support larger X values, is reasonable in part because the larger X values are generally less burdensome for the UE. Upon receipt of such a declaration of capabilities, the network is expected to send, to the UE transmissions that comply with the declaration of capabilities, i.e., that are within the capabilities of the UE as declared to the network.

In release 16 (Rel-16) of the 3GPP, span-based PDCCH monitoring capability is specified as follows. A UE is required to support (X,Y) combinations selected from (2, 2) (4, 3) (7, 3), as defined in UE feature 3-5b as the combination (X, Y) for Rel-16 PDCCH monitoring capability on the per-component carrier (per-CC) limit on the maximum number of non-overlapping control channel elements (CCEs) for ultra-reliable low-latency communication uRLLC. The UE reports the supported combinations per sub carrier spacing (SCS), and (2, 2)(4, 3)(7, 3) is applicable for SCSs of 15 kHz and 30 kHz. If a UE reports the support of more than one combination of C(X, Y) for a given SCS, and if multiple combinations of C(X, Y) are valid for the span pattern, the maximum value of C of the valid combinations is applied. A combination C(X, Y) is valid if the span pattern satisfies X and Y of the given combination in every slot, including across slot boundaries.

The span pattern definitions of Rel-15 have certain shortcomings, referred to herein as Problem 0, Problem 1, and Problem 2. Problem 0 relates to the definition of span patterns in Rel-15 not being optimized. FIG. 1D shows an example demonstrating this shortcoming. In FIG. 1D, it is assumed that the UE has reported the support of multiple combinations {(2,2), (4,3), (7,3)}. The span duration is defined as $d_{span}=\max(d_{CORESET,max}, \min Y)=\max(2,2)=2$, which results in the shown span pattern. $d_{CORESET,max}$ denotes the maximum of the CORESET lengths configured to the UE. Although the span pattern satisfies the time separation between the start of two consecutive spans and the upper limit on span length, it does not satisfy one required condition: Each MO must be fully contained within a span. As can be seen in FIG. 1D, the first MO 130 in the second row is not fully contained in one span. Therefore, the resulting span pattern is not compatible with the combination (2,2). It is not compatible with other combinations for the same reason, as the length of span is determined to be 2 and cannot be changed. The above search space configuration may not be configured to the UE, even though the UE is clearly capable of monitoring such a configuration by reporting the combination (4,3). Had the span length been determined to be 3, the PDCCH MOs could be monitored according to the combination (4,3) with a resulting valid span pattern. Therefore, span pattern definition is not optimized in Rel-15 and needlessly limits the flexibility of the network.

A second shortcoming, Problem 1, which may also be referred to as hard splitting of the blind detection/control channel element (BD/CCE) limit per span across serving cells, may be understood as follows. For a single-cell operation, Table 1 and Table 2 from TS 38.213 (reproduced in the tables of FIG. 1E and FIG. 1F, respectively) determine the maximum number of PDCCH candidates and non-overlapping CCEs a UE is required to monitor per slot for different SCS configurations µ for a given pair (X, Y). In particular, Table 1 shows the maximum number $M_{PDCCH}^{max,(X,Y),\mu}$ of monitored PDCCH candidates in a span of a span pattern (X, Y) for a downlink (DL) bandwidth part (BWP) with SCS configuration $\mu \in \{0,1\}$ for a single serving cell, and Table 2 shows the maximum number $C_{PDCCH}^{max,(X,Y),\mu}$ of non-overlapped CCEs in a span of a span pattern (X, Y) for a DL BWP with SCS configuration $\mu \in \{0, 1\}$ for a single serving cell.

Some of the constants in these tables have not yet been agreed to, and they are therefore shown as symbols, e.g., "M01" and "C01". Some embodiments disclosed herein are suitable for use with (i) any of various combinations of values for these constants or (ii) arbitrary combinations of values for these constants. It remains to determine the total number $M_{PDCCH}^{total,(X,Y),\mu}$ of PDCCH candidates and total number $C_{PDCCH}^{total,(X,Y),\mu}$ of non-overlapping CCEs for a set of scheduling cells with numerology µ and associated pair (X, Y).

A third shortcoming, Problem 2, which may also be referred to as BWP switching and span-based PDCCH monitoring, may be understood as follows. As can be seen in Table 1 and Table 2 (in FIGS. 1E and 1F respectively), span-based PDCCH monitoring, introduced in Rel-16, is only supported for subcarrier spacings (SCSs) of 15 KHz and 30 KHz. One reason for this is that higher SCSs may be associated with a short slot duration for which the required latency of uRLLC is ensured even with slot-based PDCCH monitoring, due to the short slot duration of higher SCSs. Another reason is that uRLLC applications may be served in serving cells with lower frequencies and smaller SCS due to increased link reliability.

With BWP switching, the switched BWP may have different SCS than the previously active BWP. To take this possibility into account, it may be advantageous to specify what the UE behavior should be when the network (gNB) switches BWP to a new BWP with a configuration for which span-based monitoring is not supported. Some embodiments therefore provide methods to define UE behavior for span-based PDCCH monitoring when BWP switching is carried out.

In some embodiments, Problem 0 may be addressed using a method to define the span pattern for a UE as follows. For a given set of reported combinations (X, Y) and the set of search space sets and CORESETs configured to the UE by the network, a span pattern is determined as follows. The input is the declared (or "reported") set of A={(X, Y)} by the UE and the set of search spaces and CORESETs configured to the UE by the network on the serving cell. The output is the span pattern in the slot. In some embodiments, the method includes three steps, Step 0, Step 1, and Step 2, as follows (with Step 1 having several sub-steps). Step 0 includes setting the set C of (X, Y)s that are compatible with the configured search spaces to be an empty set C={ }. Step 1 includes, for each (X, Y) E A, performing three sub-steps, Step 1-0, Step 1-1 and Step 1-2, as follows. Step 1-0 includes determining the span duration $d_{span}(Y)=\max(d_{CORESET,max}, Y)$, where $d_{CORESET,max}$ is the maximum of CORESET lengths among the configured CORESETs for the UE. Step 1-1 includes, for the span duration given in Step 1-0, determining the span pattern as follows: a) generating a bitmap b(l), 0≤l≤13, where b(l)=1 if symbol l of any slot is part of a monitoring occasion, and b(l)=0 otherwise. The first span in the span pattern begins at the smallest l for which b(l)=1. The next span in the span pattern begins at the smallest l not included in the previous span(s) for which b(l)=1. The span pattern resulting from Step 1-1 may be referred to as the "span pattern assuming the span-gap span-length pair, that includes a first set of control resource sets and a first set of search spaces." Step 1-2 includes putting (X, Y) in the set C←C∪{(X, Y)}, if the span pattern resulting from Step 1-1 satisfies the span condition according to the conditions, listed below, for a combination (X, Y) to satisfy a span pattern. Step 2 includes choosing, from the set C, either (i) the (X*, Y*) with the maximum value of $M_{PDCCH}^{max,(X,Y),\mu}$ or (ii) the (X*, Y*) with the maximum value of $C_{PDCCH}^{max,(X,Y),\mu}$. The resulting span pattern is the span pattern determined in Step 1-1 for (X, Y)=(X*, Y*) with span duration $d_{span}(Y^*)$.

The following set of conditions for a combination (X, Y) to satisfy a span pattern may be employed in Step 1-1. A span pattern may be considered to be "valid" for a combination (X, Y) if all of the following conditions hold: (i) there is a minimum time separation of X OFDM symbols (including the cross-slot boundary case) between the start of two spans (ii) each span is of length up to Y consecutive OFDM symbols of a slot, (iii) spans do not overlap on any OFDM symbol, (iv) every span is contained in a single slot, (v) the same span pattern repeats in every slot. (vi) the separation between consecutive spans within and across slots may be unequal but the same (X, Y) limit is satisfied by all spans, (vii) every monitoring occasion is fully contained in one span (that is, every PDCCH candidate is fully contained within a span), and (viii) the number of different start symbol indices of spans for all PDCCH monitoring occasions per slot is no more than $$\left\lfloor \frac{14}{X} \right\rfloor$$

(where X is the minimum value reported by the UE). Any valid span pattern may be considered to "comply" with the declaration of capabilities of the UE, in the sense that it is a member of the family of span patterns that the UE has declared itself to be capable of handling.

For example, if a UE is configured with the search space configurations shown in FIG. 2A, the resulting span pattern for (2,2) is not valid as one MO is not fully contained within a span. The resulting span pattern for (4,3) is valid as it satisfies all the conditions in the above table. The resulting span pattern for (7,3) is not valid as the time gap between the start of the first and second spans is 5, which is less than 7.

In some embodiments, Problem 1 may be addressed using a method to determine $M_{PDCCH}^{total,(X,Y),\mu}$ and $C_{PDCCH}^{total,(X,Y),\mu}$ and a rule to distribute the BD/CCE limits across PDCCH PDC different spans of the N cells, as follows. It is assumed that N scheduling cells with numerology μ and pair (X, Y) schedule a number of scheduled cells. As used herein, a span pattern is said to be "covered" by (X, Y) if the conditions in FG 3-5b are satisfied for (X, Y). The conditions are also listed above, as set of conditions for a combination (X, Y) to satisfy a span pattern. Each of the methods taught herein for addressing Problem 1 and Problem 2 may use either the determination of span pattern of Rel-15 or the method described above as a method for addressing Problem 0.

Methods for addressing Problem 1 may use the concept of "aligned span patterns", discussed in further detail below. In some embodiments, BD/CCE limits per span can be determined as follows.

A method referred to herein as Method A may be employed to determine a BD limit, as follows. If a UE is configured with $N_{cells,r16}^{DL,(X,Y),\mu}$ downlink cells with Rel-16 PDCCH monitoring capability with an associated combination (X, Y) and SCS configuration μ, where $\Sigma_\mu N_{cells,r16}^{DL,\mu} > N_{cell}^{cap-r16}$, the UE is not required to monitor more than $M_{PDCCH}^{total,(X,Y),\mu}$ PDCCH candidates per span on the active DL BWP(s) of scheduling cell(s) from the $N_{cells,r16}^{DL,(X,Y),\mu}$ downlink cells if the spans on different downlink cells from the $N_{cells,r16}^{DL,(X,Y),\mu}$ downlink cells are aligned (i.e., if together they form an aligned span pattern, discussed in further detail below), where $$M_{PDCCH}^{total,(X,Y),\mu} = \left\lfloor N_{cells}^{cap-r16} \times M_{PDCCH}^{max,(X,Y),\mu} \times \frac{N_{cells,r16}^{DL,(X,Y),\mu}}{\sum_\mu N_{cells,r16}^{DL,\mu}} \right\rfloor,$$

$N_{cell}^{DL,(X,Y),\mu}$ is the number of downlink cells with Rel-16 monitoring capability, i.e. span-based monitoring capability, with which the UE is configured, and $N_{cells}^{cap-r16}$ is the reference number of serving cells with Rel-16 monitoring capability, and is reported by the UE as a capability.

The associated combination (X, Y) is the combination (X, Y) associated with the largest maximum number of $M_{PDCCH}^{max,(X,Y),\mu}$, if the UE indicates a capability to monitor PDCCH according to multiple (X, Y) combinations and a configuration of search space sets to the UE results in a span pattern with a separation of any two consecutive PDCCH monitoring spans that is equal to or larger than the value of X for two or more of the (X, Y) combinations.

A method referred to herein as Method B may be employed to determine a non-overlapping CCE limit, as follows. If a UE is configured with $N_{cells,r16}^{DL,(X,Y),\mu}$ downlink cells with Rel-16 PDCCH monitoring capability with an associated combination (X, Y) and SCS configuration μ, where $\Sigma_\mu N_{cells,r16}^{DL,\mu} > N_{cells}^{cap-r16}$, the UE is not required to monitor more than $C_{PDCCH}^{total,(X,Y),\mu}$ non-overlapping CCEs per span on the active DL BWP(s) of scheduling cell(s) from the $N_{cells,r16}^{DL,(X,Y),\mu}$ downlink cells if the spans on different downlink cells from the $N_{cells,r16}^{DL,(X,Y),\mu}$ downlink cells are aligned (i.e., if together they form an aligned span pattern, discussed in further detail below), where $$C_{PDCCH}^{total,(X,Y),\mu} = \left\lfloor N_{cells}^{cap-r16} \times C_{PDCCH}^{max,(X,Y),\mu} \times \frac{N_{cells,r16}^{DL,(X,Y),\mu}}{\sum_\mu N_{cells,r16}^{DL,\mu}} \right\rfloor$$

and $N_{cells,r16}^{DL,\mu}$ is the number of serving cells configured with Rel-16 monitoring capability, i.e. span-based monitoring capability.

The associated combination (X, Y) is the combination (X, Y) associated with largest maximum number of CC $C_{PDCCH}^{max,(X,Y),\mu}$, if the UE indicates a capability to monitor PDCCH according to multiple (X, Y) combinations and a configuration of search space sets to the UE results in a span pattern with a separation of any two consecutive PDCCH monitoring spans that is equal to or larger than the value of X for two or more of the (X, Y) combinations.

Figure 2B:
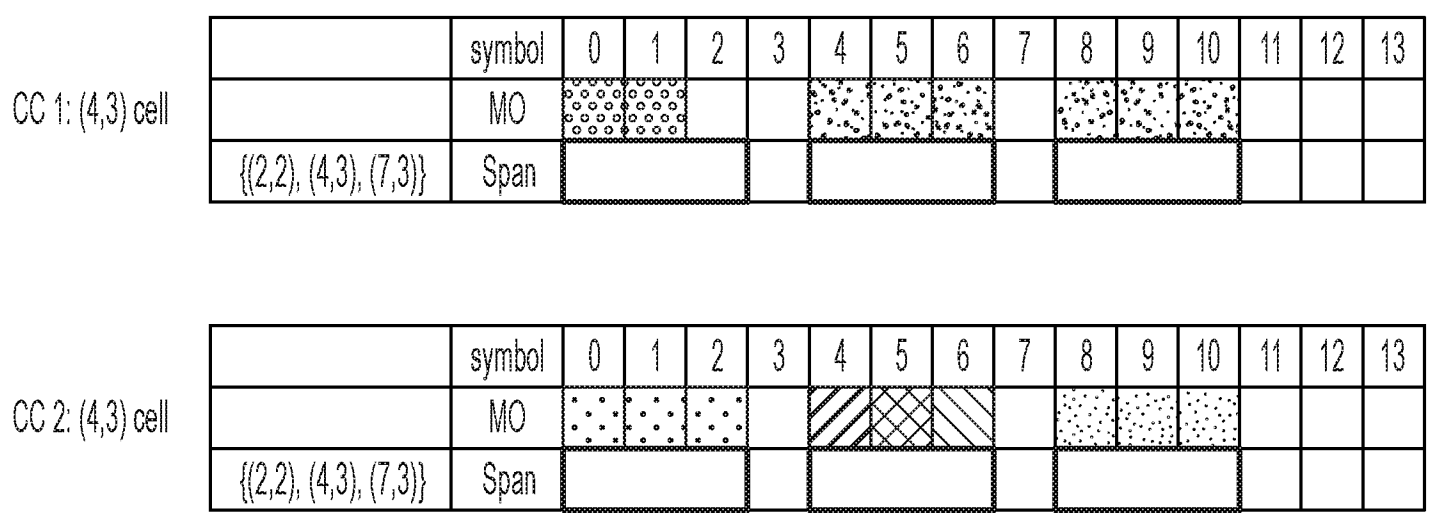

It then remains to define (i) how to determine span determination in "per span" mentioned in Method A and B and (ii) how to determine whether the spans on different downlink cells from the $N_{cells,r16}^{DL,(X,Y),\mu}$ downlink cells are aligned. In one embodiment, which may be referred to as Embodiment 0-A, the case of aligned spans may be defined as follows. The span pattern on a set of (X, Y) serving cells is considered to be aligned if every two spans on the same or two different cells either (i) have the same starting and ending symbols or (ii) the time gap between the start of the two spans is at least X symbols. An example is shown in FIG. 2B, where the UE is configured with N=2 serving cells, CC1 and CC2, both with (X, Y)=(4,3). The span pattern is classified as aligned according to Embodiment 0-A.

Figure 2C:
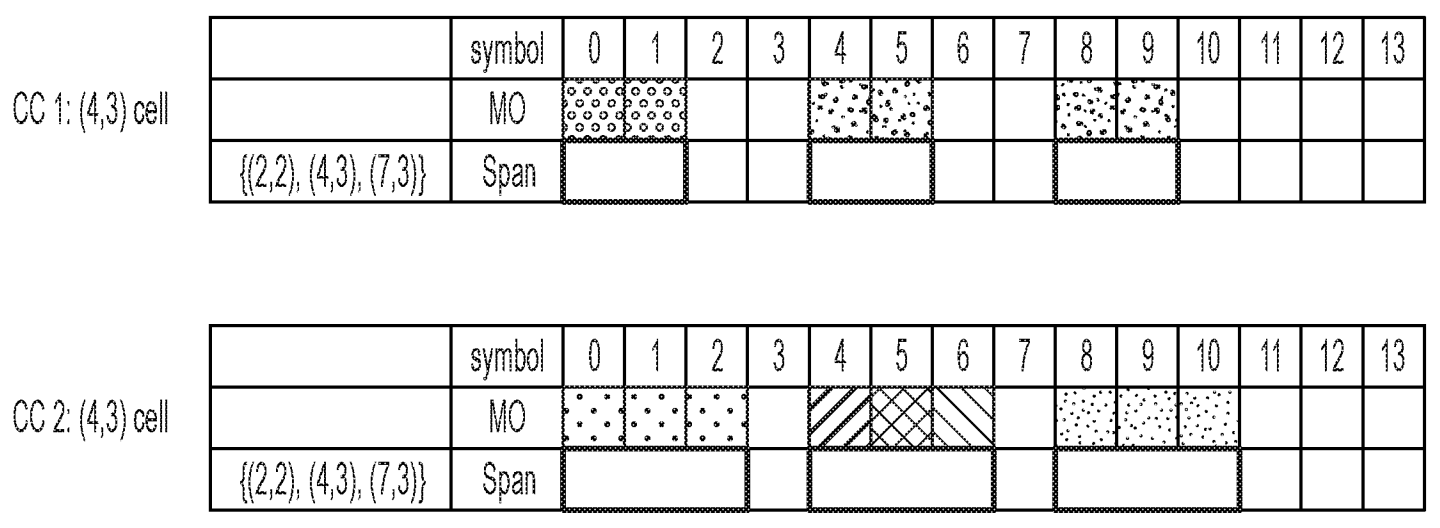

In another embodiment, which may be referred to as Embodiment 0-B, the case of aligned spans may be defined as follows. The span pattern on a set of (X, Y) serving cells is considered to be aligned if every two spans on the same or two different cells either (i) have the same starting symbols or (ii) the time gap between the start of the two spans is at least X symbols. An example is shown in FIG. 2C, where the UE is configured with N=2 serving cells, CC1 and CC2, both with (X, Y)=(4,3). The span pattern is classified as aligned according to Embodiment 0-B. The definition of an aligned span pattern in Embodiment 0-B can be stated alternatively as follows. A span pattern in the group of (X, Y) cells may be classified as aligned if the following condition is satisfied: For any span in any cell whose starting symbol is 'i', any other span in all cells in the group (including the cell itself) should have starting symbol 'j' satisfying either 'i=j' or '|i−j|>=X". This rule can be applied within a slot or across slots. Alternatively, for any span in any cell whose starting symbol is 'i', there should be no span in any cell in the group (including the cell itself) which has starting symbol 'j' not satisfying either 'i=j' or '|i−j|>=X". This rule can be applied within a slot or across slots.

Figure 2D:
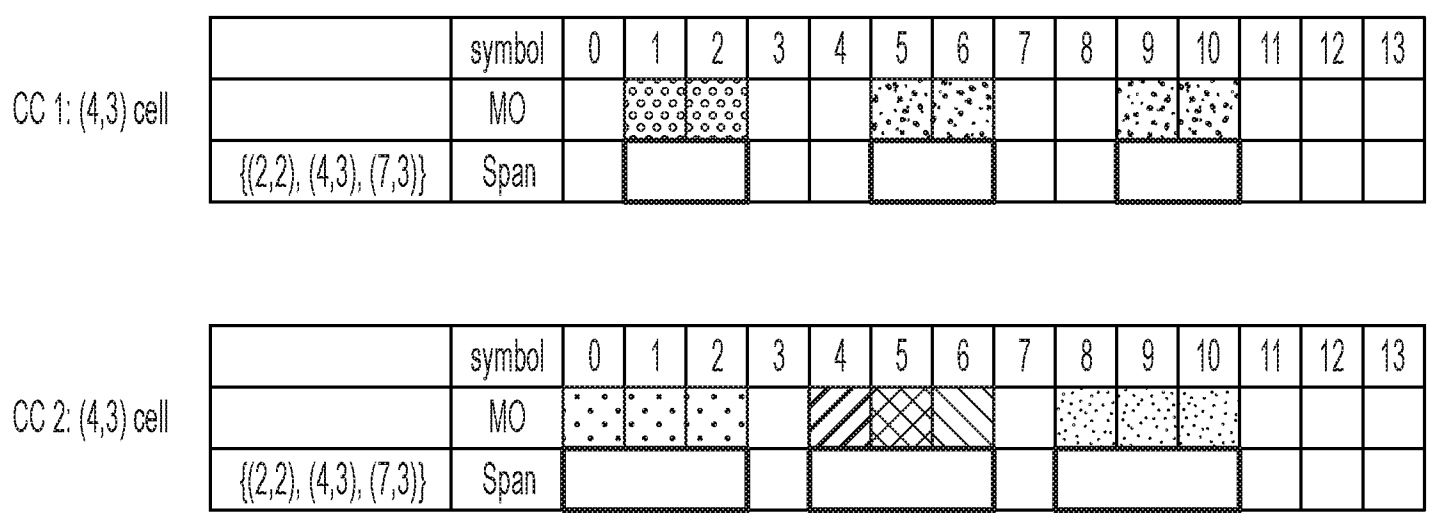

In another embodiment, which may be referred to as Embodiment 0-C, the case of aligned spans may be defined as follows. The span pattern on a set of (X, Y) serving cells is considered to be aligned if every two spans on the same or two different cells either (i) have the same ending symbols or (ii) the time gap between the start of the two spans is at least X symbols. An example is shown in FIG. 2D, where the UE is configured with N=2 serving cells, CC1 and CC2, both with (X, Y)=(4,3). The span pattern is classified as aligned according to Embodiment 0-C.

The definition of an aligned span pattern in Embodiment 0-C can be stated alternatively as follows. A span pattern in the group of (X, Y) cells may be classified as aligned if the following condition is satisfied: For any span in any cell whose ending symbol is 'i', any other span in all cells in the group (including the cell itself) should have ending symbol 'j' satisfying either 'i=j' or '|i−j|>=X'. This rule can be applied within a slot or across slots. Alternatively, for any span in any cell whose ending symbol is 'i', there should be no span in any cell in the group (including the cell itself) which has ending symbol 'j' not satisfying either 'i=j' or '|i−j|>=X'. This rule can be applied within a slot or across slots.

Figure 2E:
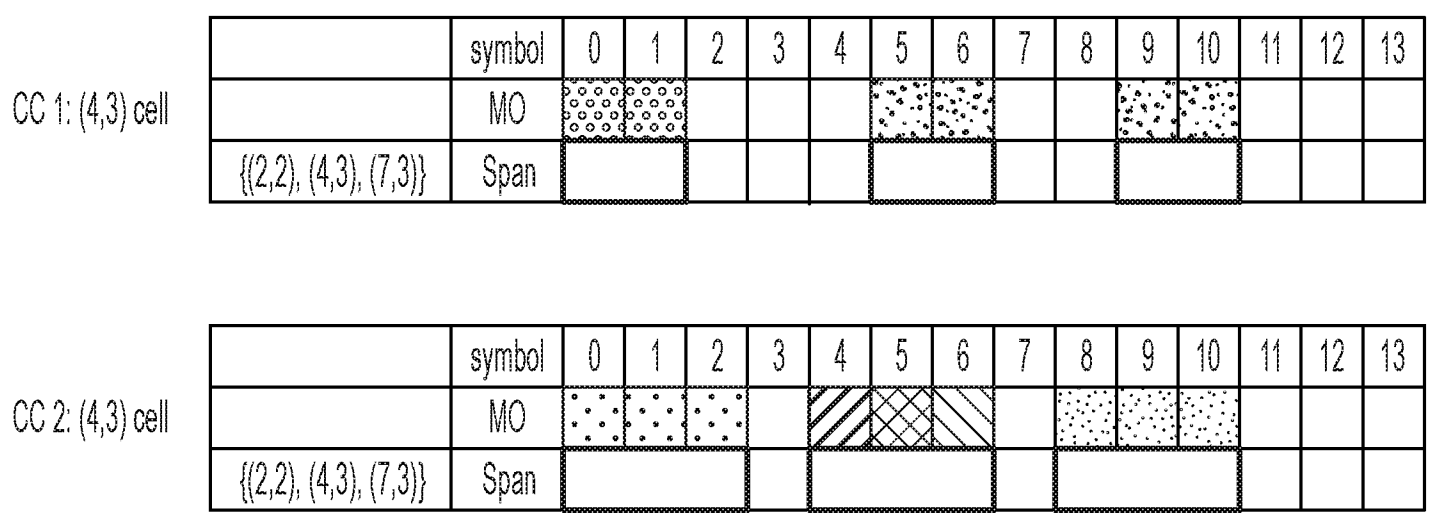

In another embodiment, which may be referred to as Embodiment 0-D, the case of aligned spans may be defined as follows. The span pattern on a set of (X, Y) serving cells is considered to be aligned if every two spans on the same or two different cells either (i) have the same starting or ending symbols or (ii) the time gap between the start of the two spans is at least X symbols. An example is shown in FIG. 2E, where the UE is configured with N=2 serving cells, CC1 and CC2, both with (X,Y)=(4,3). The span pattern is classified as aligned according to Embodiment 0-D. The definition of an aligned span pattern in Embodiment 0-D can be stated alternatively as follows. A span pattern in the group of (X, Y) cells may be classified as aligned if the following condition is satisfied: For any span in any cell whose starting symbol is 'i_start' and ending symbol is "i_end", any other span in all cells in the group (including the cell itself) whose starting symbol is "j_start" and ending symbol is "j_end", satisfies either 'i_start=j_start' or 'i_end=j_end' or '|i_start−j_start|>=X'. This rule can be applied within a slot or across slots. An alternative description of the above condition is as follows: for any span in any cell whose starting symbol is "i_start" and ending symbol is "i_end", there should be no span in any cell in the group (including the cell itself) which has starting symbol 'j_start' and ending symbol "j_end" not satisfying either 'i_start=j_start' or 'i_end=j_end' or '|i_start−j_start|>=X'. This rule can be applied within a slot or across slots.

In another embodiment, which may be referred to as Embodiment 1, the case of aligned spans may be defined as follows. The span pattern is determined jointly for the (X, Y) cells. If the resulting span pattern is "covered" by (X, Y), the case is classified as aligned. For the purpose of $C_{PDCCH}^{total}/M^{total}$, "span" is determined according the joint pattern instead of the individual patterns of each cell. The following procedure is employed to determine if the spans on different downlink cells from the $N_{cells,r16}^{DL,(X,Y),\mu}$ downlink cells are aligned according to this embodiment. The input is a group of N downlink serving cells CC 1, CC 2, ..., CC N with indices 1, 2, ..., N, each with an associated (X, Y) pair. The procedure includes four steps, Step 1, Step 2, Step 3, and Step 4, as follows. Step 1 includes letting $S_i$, i=1, ..., N, be the union of all the search space sets configured in serving cell with index i. Step 2 includes defining the set S to be the union of sets $S_i$ among all the serving cells. A bit map, for the determination of the span pattern in Step 3, is obtained as follows. A bitmap b(l), 0≤l≤13 is generated, where (i) b(l)=1 if symbol l of any slot on any cell among the group of serving cells is part of a monitoring occasion, and (ii) b(l) 0 otherwise. The first span in the span pattern begins at the smallest l for which b(l) 1. The next span in the span pattern begins at the smallest l not included in the previous span(s) for which b(l) 1. Step 3 includes determining the span pattern for a virtual cell with the same numerology as that of the N cells based on (i) the set of all search spaces S and the obtained bitmap b(l), and (ii) the set of values of {(X, Y)}reported by the UE. The determination is based on a Rel-15 span pattern determination. Step 4 includes determining, by the UE, that the span pattern determined in Step 3 is an aligned span pattern if (X, Y) covers the span pattern determined in Step 3 and that it is not an aligned span pattern otherwise.

Figure 2F:
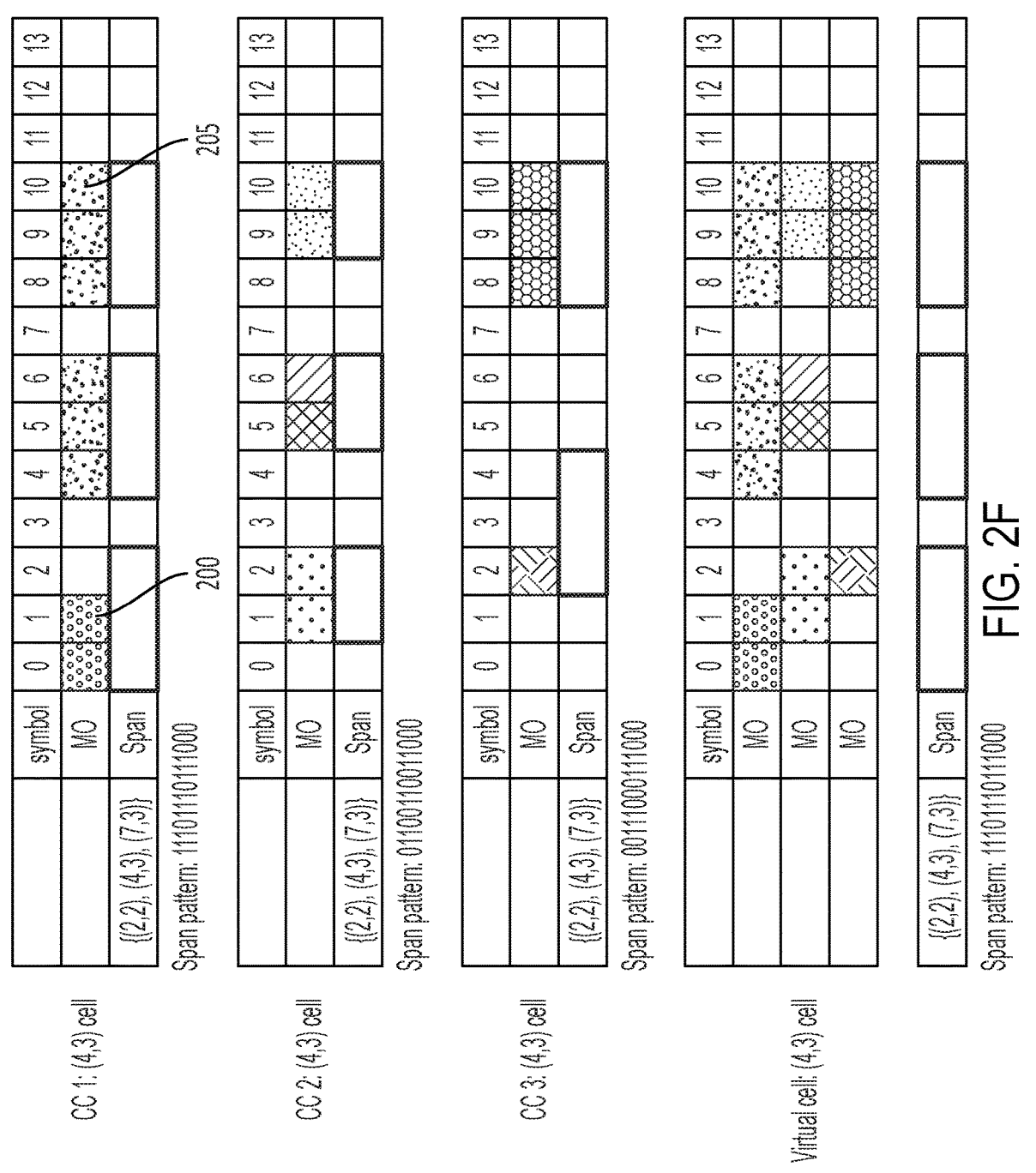

Example 1: The UE is configured with N=3 serving cells both with (X, Y)=(4,3) as shown in FIG. 2F. MOs on CC 1 correspond to search space sets associated with a length-2 CORESET 200 and a length-3 CORESET 205. The span pattern is obtained is determined to be 11101110111000. The associated (X, Y) is equal to (4,3) so this is a (4,3) cell. MOs on CC 2 correspond to search space sets associated with two length-2 CORESETs and two length-1 CORESETs. The span pattern is obtained as 01100110011000. Both (2,2) and (4,3) cover this span pattern. But assuming that (4,3) has a larger per-span single-cell BD/CCE limit than (2,2), pair (4,3) is associated with this cell and therefore CC 2 too is a (4,3) cell. CC3 is also configured with two search spaces associated with two different CORESETs. To determine whether the span patterns on these three cells are aligned or not, the procedure of Embodiment 1 is employed to determine the span pattern for a virtual cell considering all the MOs (search spaces on all cells). The span pattern of the virtual cell is found to be 11101110111000 which is covered by (4,3), so these two cells are categorized as aligned. As such, in FIG. 2F, the three (4,3) cells CC1, CC2 and CC3 are considered to be aligned as the union of all search spaces results in span pattern that is covered by (4, 3).

Figure 2G:
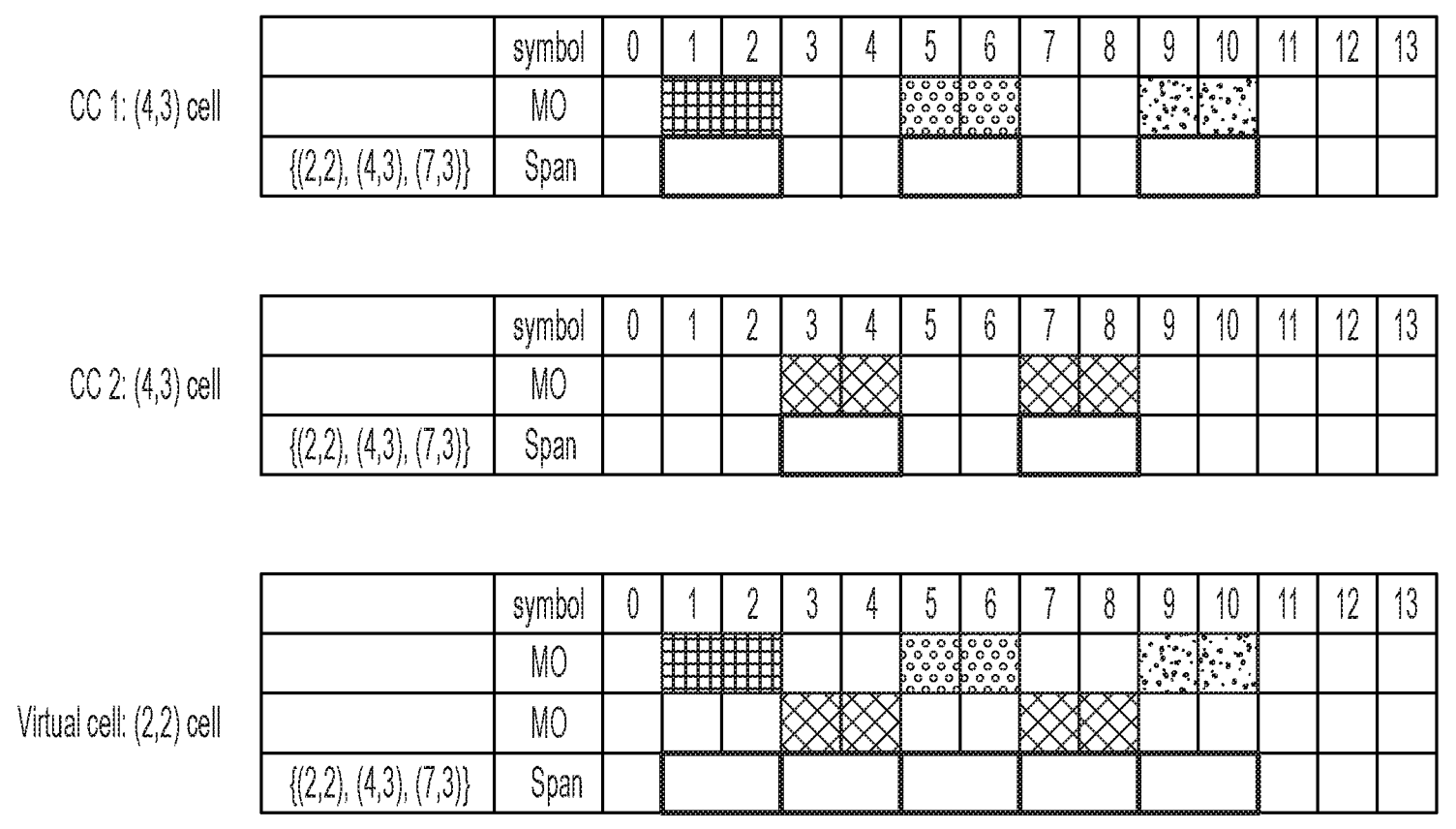

In another embodiment, which may be referred to as Embodiment 2, the case of aligned spans may be defined as follows, using a single-cell to CA (X, Y) transform. Prior to applying to CA hard splitting equations (the equations specifying $M_{PDCCH}^{total,(X,Y),\mu}$ and $C_{PDCCH}^{total,(X,Y),\mu}$), a group of cells is identified via association to the same (X, Y) according to the single-cell max BD/CCE limit rule. This rule states that if multiple pairs of (X, Y) satisfy the span pattern, the cell is associated with the pair (X, Y) with the largest BD/CCE limit per span. As is shown below, it may be possible that the span pattern on the virtual cell is not covered by the pair (X, Y) but with a new pair (X', Y'). FIG. 2G shows an example of an aligned case, with two (4,3) cells and the virtual cell. The virtual cell is not covered by (4,3).

As can be seen from FIG. 2G, the span pattern on CC1 and CC2 is covered by both pairs (2,2) and (4,3). According to the max BD/CCE limit rule, both cells are associated to be (4,3) cells and the BD/CCE limit for (4,3) would be applied for each span on these cells for the non-CA case. On the other hand, with CA and hard splitting, the virtual cell would not be a (4,3) cell so according to Embodiment 1 and 2 this would be an unaligned case. Although (4,3) does not cover the virtual cell, (2,2) does. Since (2,2) also covers each individual cell, one UE behavior is to assume the individual cells as (2,2) and consider this case as an aligned case. As such, the following definition of an aligned span pattern may be used, based on a non-CA (X, Y) to CA (X,Y) transform: For a set of cells with the same numerology and the same associated pair (X, Y), a span pattern is defined for each cell. Additionally, a virtual cell is defined as having the set of search spaces that are the union of all SSs across all the cells according to Embodiment 1. Let P be the set of pairs (X, Y) reported by the UE and let $P_{all}$ be a subset of P including all the pairs which cover the span pattern on the virtual cell. If $P_{all}$ is non-empty, then the set of search spaces is deemed to correspond to an aligned span pattern. The virtual cell is associated with a pair $(X_{all}, Y_{all}) \subset P_{all}$ with a maximum single-cell BD/CCE limit per span according to Table 1 and Table 2. The aligned case is associated with $(X_{all}, Y_{all})$ and the span pattern on the virtual cell is applied to all the cells.

For the example shown in FIG. 2G, $P=P_{all}=\{(2,2)\}$ so the set of search spaces corresponds to an aligned span pattern, with the associated pair $(X_{all}, Y_{all})=(2,2)$ and the span pattern shown for the virtual cell.

In another embodiment, which may be referred to as Embodiment 3, the applicable span for determining the total BD/CCE limit per span may be defined as follows. Once the span pattern is classified as aligned according to any one of Embodiments 0-A, 0-B, 0-C, 0-D, and 1, a span for monitoring of $C_{PDCCH}^{total,(X,Y),\mu}$ non-overlapping CCE or $M_{PDCCH}^{total,(X,Y),\mu}$ PDCCH candidates given in Method A and Method B is determines as follows.

For Embodiment 0-A, 0-B, 0-C or 0-D, for each set of overlapping spans, a span with largest length is chosen to define per-span limits in Method A and Method B. The determined span pattern on the virtual cell is used to define per-span in Method A and Method B. In other words, the UE is not required to monitor more than $M_{PDCCH}^{total,(X,Y),\mu}$ PDCCH candidates or $C_{PDCCH}^{total,(X,Y),\mu}$ non-overlapping CCEs per span on the active DL BWP(s) of scheduling cell(s) from the $N_{cells,r16}^{DL,(X,Y),\mu}$ downlink cells where span is determined according to Embodiment 0-A or 0-B or 0-C or 0-D.

For each of Embodiment 1 and 2, the determined span pattern on the virtual cell may be used to define per-span limits in Method A and Method B. In other words, the UE is not required to monitor more than $M_{PDCCH}^{total,(X,Y),\mu}$ PDCCH candidates or $C_{PDCCH}^{total,(X,Y),\mu}$ non-overlapping CCEs per span on the active DL BWP(s) of scheduling cell(s) from the $N_{cell}^{DL,(X,Y),\mu}$ downlink cells where span is determined according to Embodiment 1 or 2.

Example 2: This example considers the scenario in Example 1 where the span patterns on the three cells have been determined to be aligned. The UE is not required to monitor more than $M_{PDCCH}^{total,(X,Y),\mu}$ PDCCH candidates or $C_{PDCCH}^{total,(X,Y),\mu}$ non-overlapping CCEs per first span, i.e., {symbol 0, 1 and 2} or second span, i.e., {symbol 4, 5 and 6} or third span, i.e., {symbol 8, 9 and 10} on the active DL BWP(s) of CC1 and CC 2.

Example 3: This example considers the case of FIG. 2F with (i) the SCS configuration $\mu=0$, and (ii) the UE reporting a CA capability for $N_{cells}^{cap-r16}=1$ cells. $M_{PDCCH}^{max,(4,3),\mu=0}=M01=28$ and $C_{PDCCH}^{max,(4,3),\mu=0}=C01=56$ in Table 1 and Table 2, (iii) the total number of configured DL cells being $\Sigma_\mu N_{cells,r16}^{DL,\mu}=4$ among which $N_{cells,r16}^{DL,(4,3),\mu=0}=3$ cells are associated with (X, Y)=(4,3) and $\mu=0$, and (iv) the search space configuration, the span pattern on each cell, and the span pattern on the virtual cell, being defined as shown in FIG. 2F, according to method A and method B, the resulting total number of PDCCH candidates and non-overlapping CCEs may be determined as follows:

$$M_{PDCCH}^{total,(4,3),\mu=0} = \left\lfloor N_{cells}^{cap-r16} \times M_{PDCCH}^{max,(4,3),\mu=0} \times \frac{N_{cells,r16}^{DL,(4,3),\mu=0}}{\sum_\mu N_{cells,r16}^{DL,\mu}} \right\rfloor = \left\lfloor 1 \times 28 \times \frac{3}{4} \right\rfloor = 21$$

and $$C_{PDCCH}^{total,(4,3),\mu=0} = \left\lfloor N_{cells}^{cap-r16} \times C_{PDCCH}^{max,(4,3),\mu=0} \times \frac{N_{cells,r16}^{DL,(4,3),\mu=0}}{\sum_\mu N_{cells,r16}^{DL,\mu}} \right\rfloor = \left\lfloor 1 \times 56 \times \frac{3}{4} \right\rfloor = 42.$$

This accordingly gives the following limits. The BD limit may be given by: (i) in the first span, i.e., symbols 0, 1 and 2: {Number of monitored PDCCH candidates on CC 1}+{Number of monitored PDCCH candidates on CC 2}≤21 (ii) in the second span, i.e., symbols 4, 5 and 6: {Number of monitored PDCCH candidates on CC 1}+{Number of monitored PDCCH candidates on CC 2}≤21, and (iii) in the third span, i.e., symbols 8, 9 and 10: {Number of monitored PDCCH candidates on CC 1}+{Number of monitored PDCCH candidates on CC 2}≤21.

The CCE limit may be given by (i) in the first span, i.e., symbols 0, 1 and 2: {Number of monitored non-overlapping CCEs on CC 1}+{Number of monitored non-overlapping CCEs on CC 2}≤42, (ii) in the second span, i.e., symbols 4, 5 and 6: {Number of monitored non-overlapping CCEs on CC 1}+{Number of monitored non-overlapping CCEs on CC 2}≤42, and (iii) in the third span, i.e., symbols 8, 9 and 10: {Number of monitored non-overlapping CCEs on CC 1}+{Number of monitored non-overlapping CCEs on CC 2}≤42.

Figure 2H:
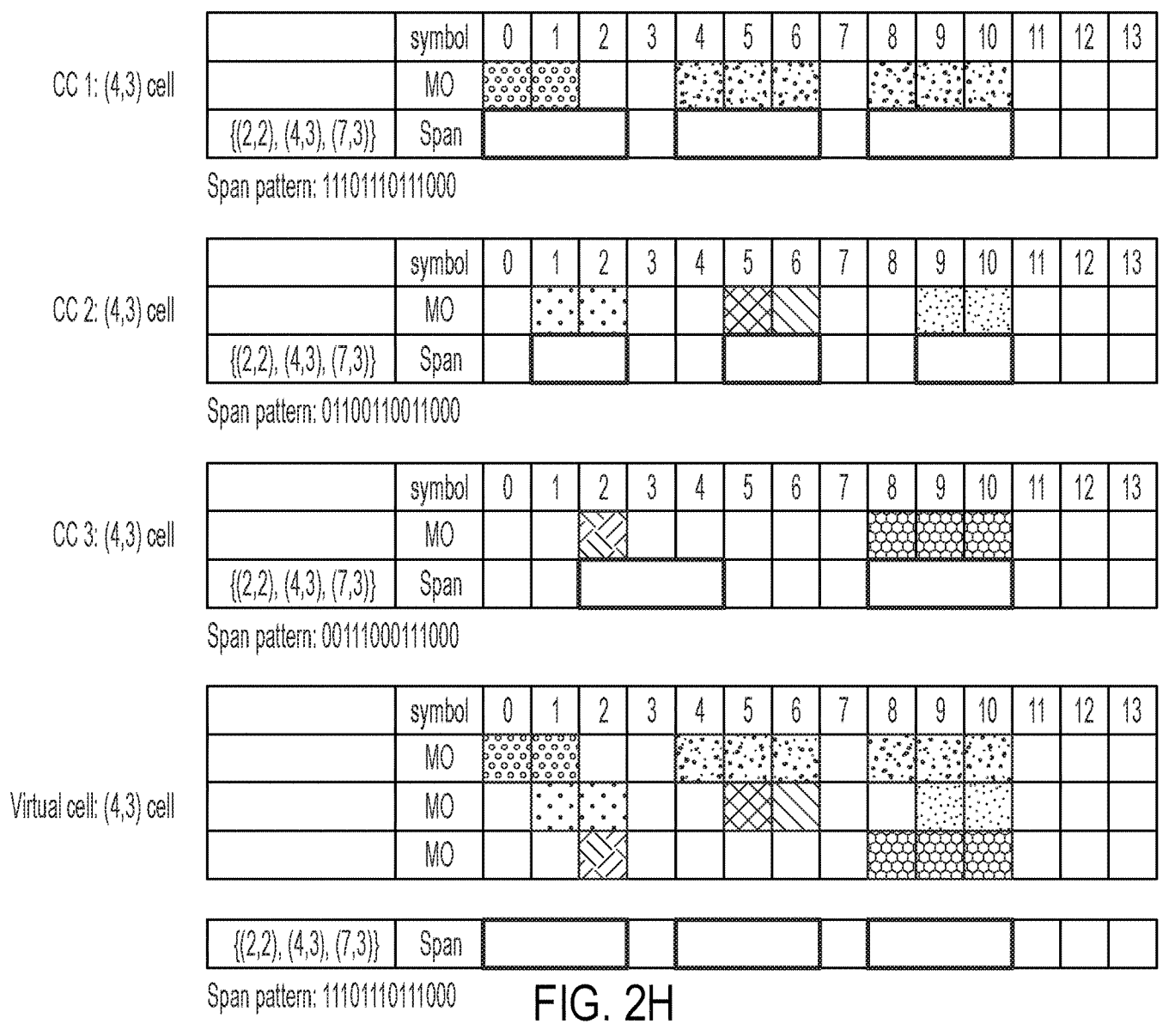
Figures 2, 2I:
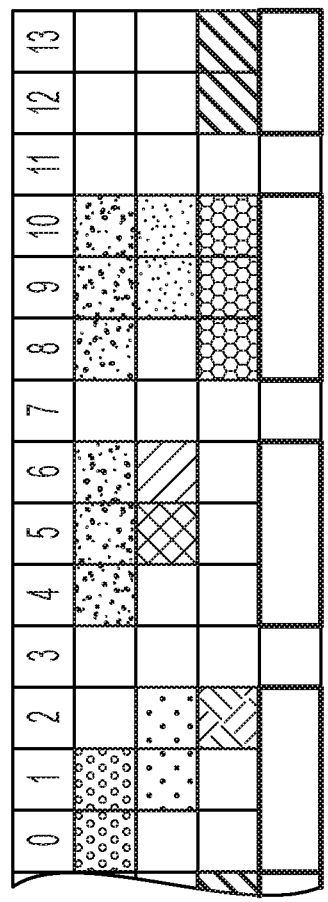
Figure 2J:
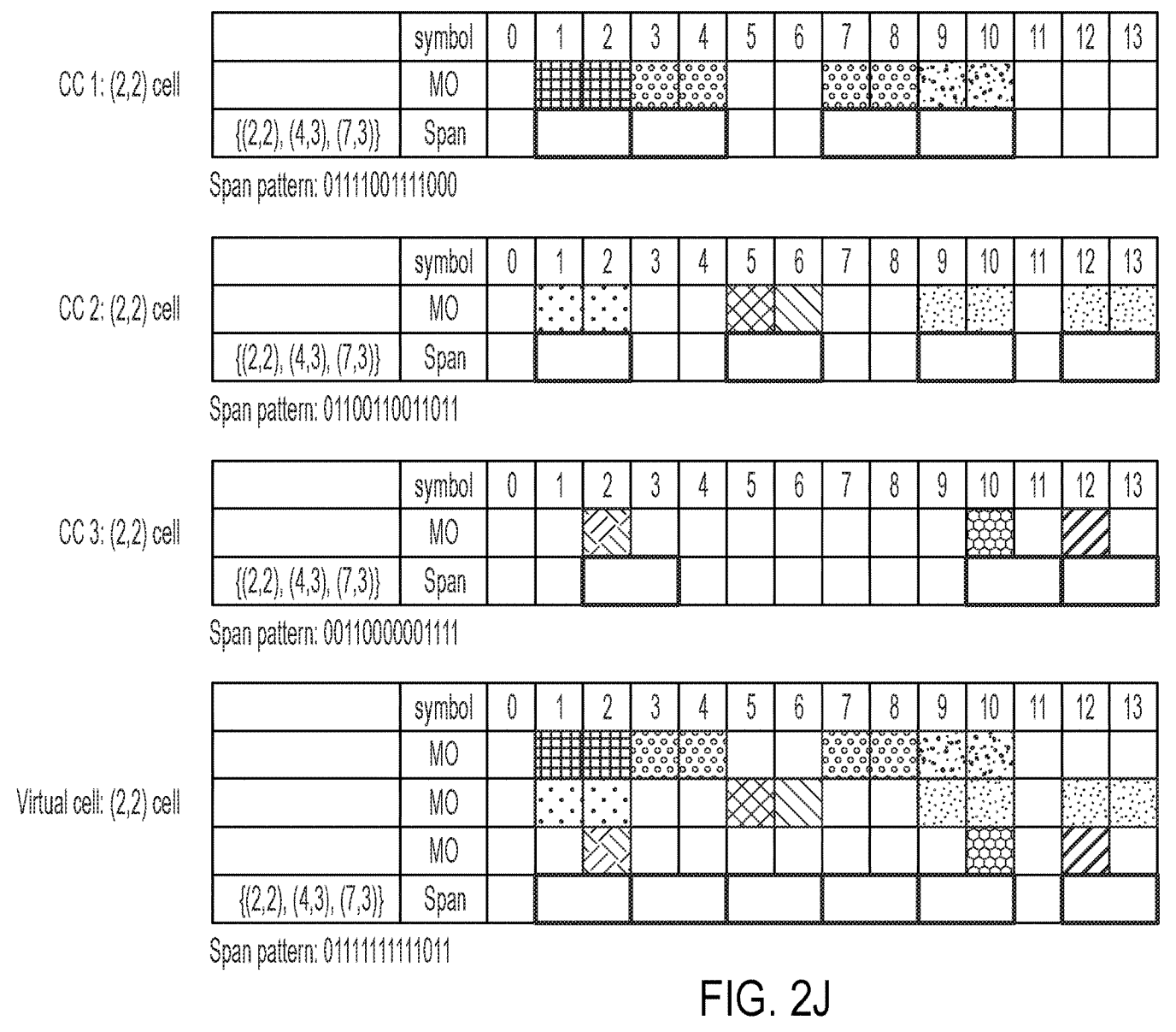
Figure 2K:
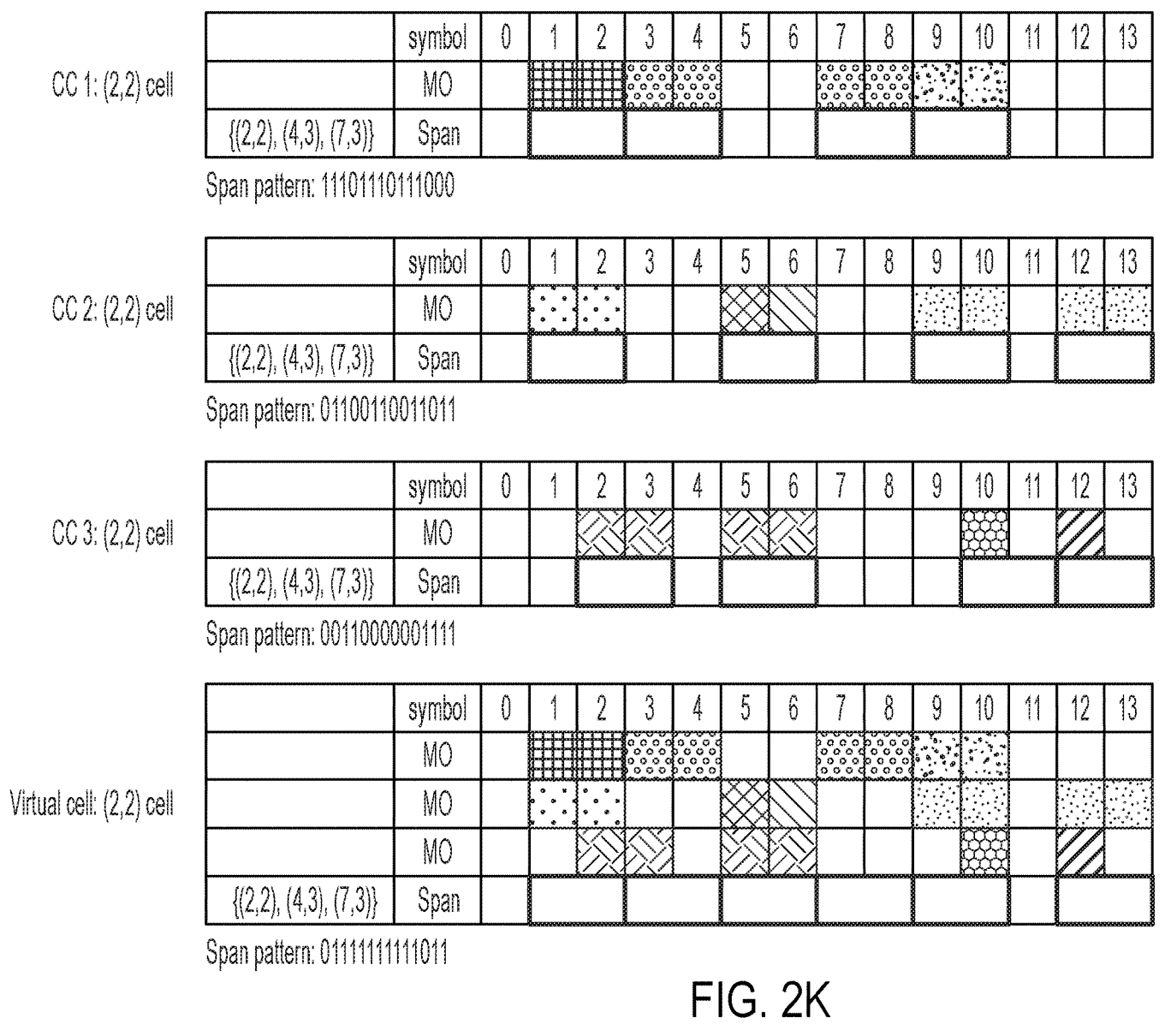

The following are additional examples which are categorized as aligned or unaligned according to Embodiment 1. FIG. 2H shows an aligned case: CC 1, CC 2 and CC 3 are categorized as aligned as (4,3) covers the span pattern on the virtual cell. FIGS. 21-1 and 21-2 show an unaligned case. This case differs from that of FIG. 2H in that an MO with a length-2 CORESET 210 has been added on CC 3. In this case, (4,3) no longer covers the resulting span pattern as the time gap between the last span in the first slot and the first span in the second slot is less than 3. FIG. 2J is an example of an aligned case: (2,2) covers the span pattern on the virtual cell. FIG. 2K is an example of an unaligned case: it differs from FIG. 2J in that MOs associated with a length-2 CORESET on CC 3 have been added, and (2,2) no longer covers the resulting span pattern on the virtual cell.

The reason CC 1, 2 and 3 in FIG. 2K are considered unaligned is that the resulting span pattern on the virtual cell is no longer covered by (2,2). This is because, as part of the span definition, every MO is required to be contained within one span. As can be seen, on CC 3 there is a length-2 MO, part of which appears in the first span on the virtual cell and part of which appears in the second span on the virtual cell.

Unaligned span patterns may be handled as follows. Once a span pattern is defined as unaligned, how the PDCCH candidates, or non-overlapping CCEs may be distributed among different spans across the cells may be specified. To this end, the following provide three different interpretations of $C_{PDCCH}^{total,(X,Y),\mu}/M_{PDCCH}^{total,(X,Y),\mu}$.

In an embodiment which may be referred to as Embodiment 4, or as Interpretation 1, a uniform distribution may be used. In this embodiment, the UE is not required to monitor more than $C_{PDCCH}^{total,(X,Y),\mu}$ non-overlapping CCEs or $M_{PDCCH}^{total,(X,Y),\mu}$ PDCCH candidates for any set of spans across the active DL BWP(s) of scheduling cell(s) from the downlink cells, with at most one span per scheduling cell for each set. Both $C_{PDCCH}^{total,(X,Y)}$ and $M_{PDCCH}^{total,(X,Y),\mu}$ may be based on a declaration of capabilities sent to the network by the UE.

In an embodiment which may be referred to as Embodiment 5, or as Interpretation 2, alignment-based cell partitioning may be used. In this embodiment, the UE is not required to monitor more than $C_{PDCCH}^{total,(X,Y),\mu}$ non-overlapping CCEs or $M_{PDCCH}^{total,(X,Y),\mu}$ PDCCH candidates for any set of spans across the active DL BWP(s) of scheduling cell(s) from the downlink cells, where the set of spans are not aligned with each other.

Figure 2L:
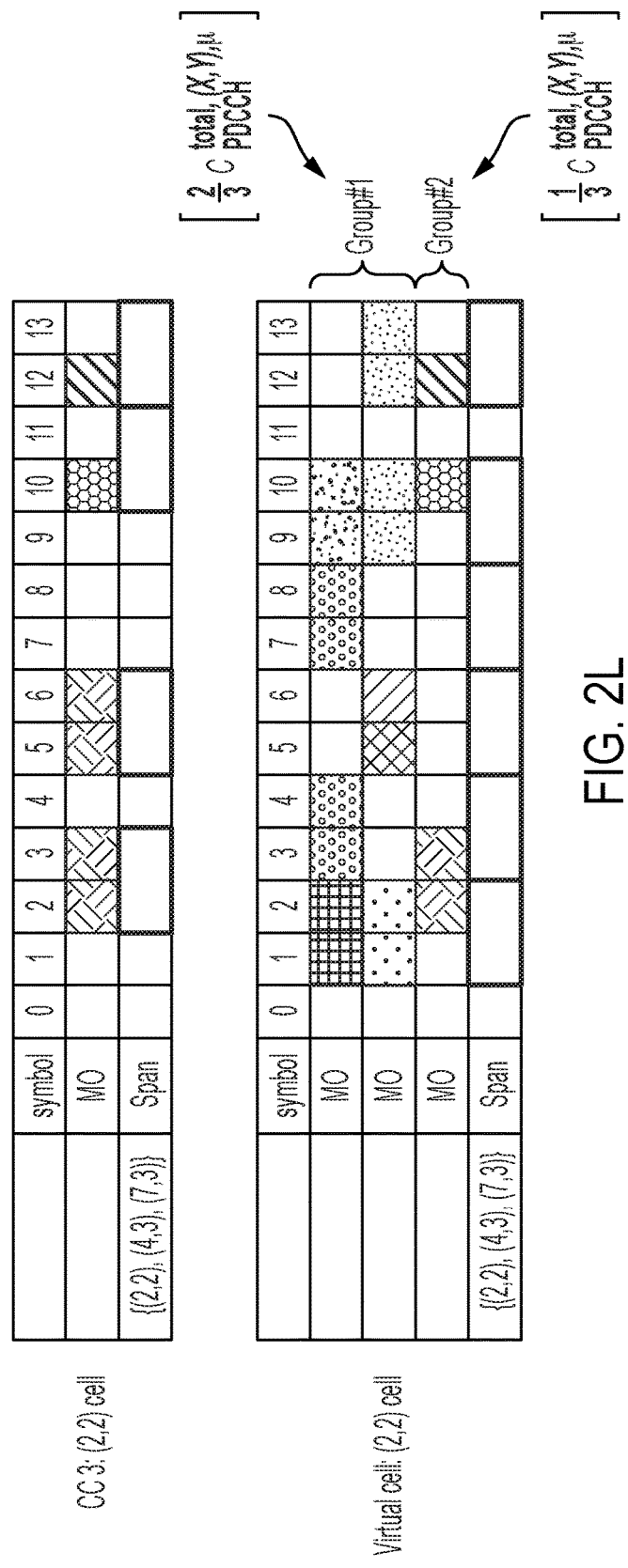
FIG. 2L is a span diagram, according to an embodiment of the present disclosure.

It is possible that the set of cells associated with (X, Y) are such that the resulting span pattern is unaligned but if some of the cells are excluded they would be classified as aligned according to the definition given in one of Embodiments 0-A to 0-D, 2 and 3. In that case a number of cell groups may be defined such that in each group the cells are aligned with each other. In FIG. 2L (an example in which CC1, CC2 and CC3 are unaligned according to Embodiment 1 since (2, 2) does not cover the virtual cell span pattern), cell 1 and 2 are grouped together and cell 3 is grouped by itself. $M_{PDCCH}^{total,(X,Y),\mu}$ and $C_{PDCCH}^{total,(X,Y),\mu}$ are scaled by the fraction of cells in a group to obtain the total BD/CCE limit for each group.

In some embodiments, alignment-based cell grouping may be used. In a set of N serving cells with indices 1, ..., N with the same (X, Y) and numerology μ, a number of groups of cells may be formed using five steps, Step-0 Step-1, Step-2, Step-3, and Step-4, as follows.

Step-0: Make a set G of as-of-yet ungrouped cell indices: G={1, ..., N}

Step-1: Make $G_1$ a subset of G with the largest cardinality such that all the cells in $G_1$ are classified as aligned. Set G←G←$G_1$ Step-2: Set L=1 the number of formed groups Step-3: While G is non-empty
L←L+1
Make $G_L$ as a subset of G with the largest cardinality such that all the cells in $G_L$ are classified as aligned.
G←G←$G_L$
End while Step-4: Let $N_l$ be the cardinality of $G_l$ for l=1, ..., L
The total BD/CCE limit for a group of cells indexed by $G_l$ is determined as $$M_{PDCCH}^{total,(X,Y),\mu,l} = \left\lfloor \frac{N_l}{N} M_{PDCCH}^{total,(X,Y),\mu} \right\rfloor \text{ and } C_{PDCCH}^{total,(X,Y),\mu,l} = \left\lfloor \frac{N_l}{N} C_{PDCCH}^{total,(X,Y),\mu} \right\rfloor$$

For group l with $N_l$ cells, Embodiment 3 is employed by using $M_{PDCCH}^{total,(X,Y),\mu,l}$ and $C_{PDCCH}^{total,(X,Y),\mu,l}$ in place of $M_{PDCCH}^{total,(X,Y),\mu}$ and $C_{PDCCH}^{total,(X,Y),\mu}$ to determine the BD/CCE limit per span across the cells.

Figure 2M:
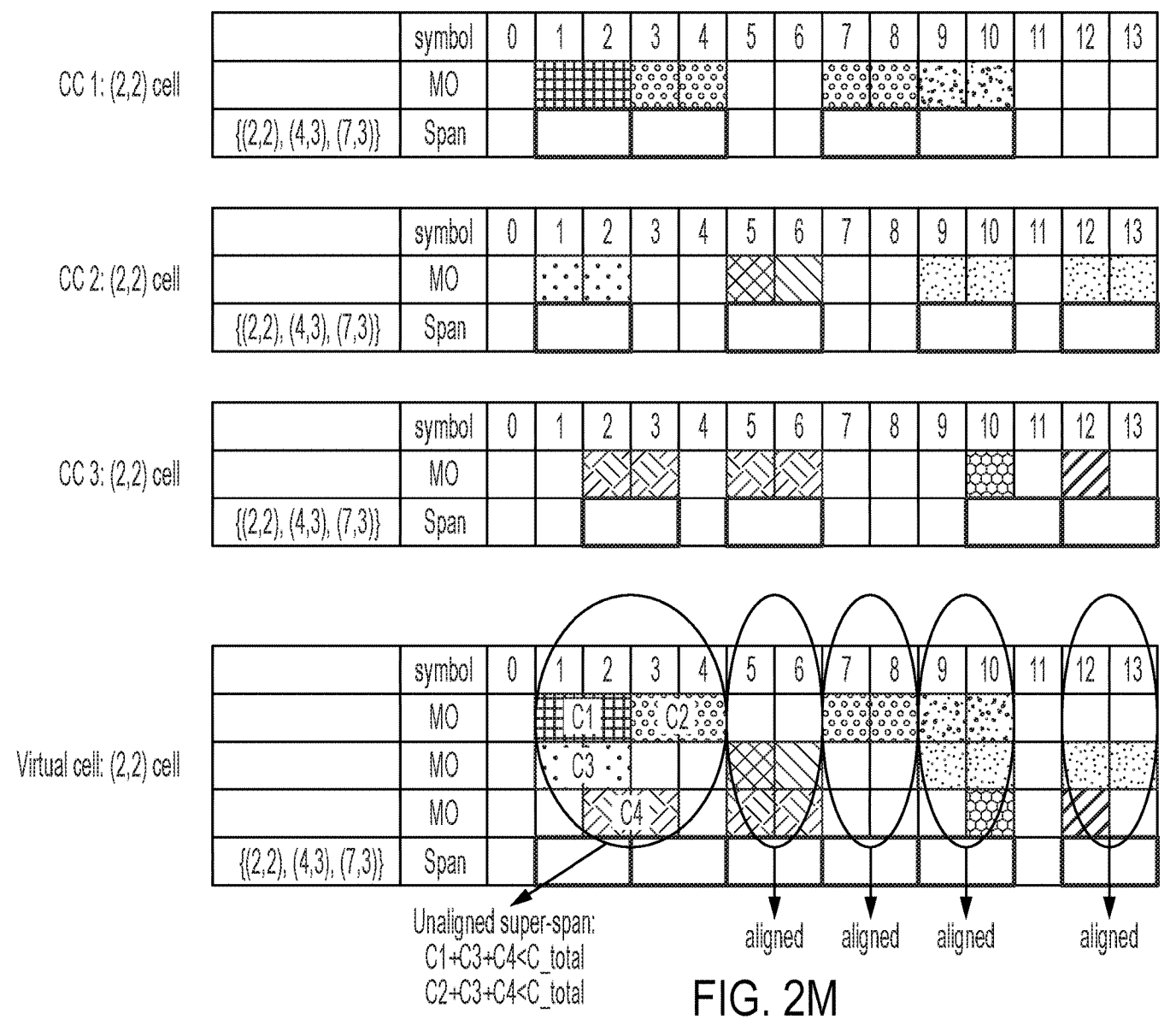

In an embodiment which may be referred to as Embodiment 6, or as Interpretation 3, time-domain span merging may be used. For a set of cells associated with (X, Y) that are classified as unaligned, it may be the case that removing a certain number of spans on some of the cells will result in their being classified as aligned. FIG. 2M shows an example. The resulting span pattern in the virtual cell is not covered by (2,2) so the case is considered unaligned. (2,2) does not cover the span pattern because there is an MO which is not fully contained in one span. If the four spans in symbols 1, 2, 3, and 4 are excluded, all other spans will result in an aligned case. Once these four spans are added the case will become unaligned. Instead of considering the case as unaligned and uniformly distributing the BD/CCE limit across all spans according to Embodiment 4, it may be beneficial to consider the four spans of symbols 1, 2, 3, and 4 as one "super span" (a method that may be referred to as "span merging") and apply two equations on it as shown in FIG. 2M. For each of symbols 5 and 6, symbols 7 and 8, symbols 9 and 10 and symbols 12 and 13 one separate equation is defined, resulting in four different independent equations.

The following pseudo-code can be used to determine the set of "super-spans" for a set of cells classified as unaligned according to any of the Embodiments 0-A to 2.

Step-0: Determine the span pattern on the virtual cell. Let L be the number of spans and $S_i$ be the i-th span on the virtual cell, i=1, ..., L. $S_i$ is a set containing the symbol numbers in the i-th span. $S_i \subset \{0, 1, ..., 13\}$. Define F as a set containing the $S_i$, i.e., Γ={$S_1$, ..., $S_L$}. In FIG. 2M, L=6, $S_1$={1,2}, $S_2$={3,4}, $S_3$={5,6}, $S_4$={7,8}, $S_5$={9,10} and $S_6$ {12,13}

Step-1: The following procedure is only run if a "Merging Condition" is satisfied. The Merging Condition is satisfied if ("Merging Condition 1)") there is an MO on any of the cells which is not fully contained in one span among the L spans or ("Merging Condition 2)") there are at least two spans in Γ which does not satisfy the inter-span X condition, including cross-slot inter-span gaps.

Step-3: While Merging Condition 1) is satisfied:
Find the earliest span such that there is an MO which is not fully contained in the span. Combine this span with the next span to form a new span. The new span includes all the symbols from the first symbol of the earliest span to the last symbol of the next span.
 a) Update the set of spans by removing the two spans and including the new span in the set
 b) Update L to be the number of spans in the set of spans
End while
Step-4: While Merging Condition 2) is satisfied
Find the earliest span such that the number of symbols from the start of the span to the start of the next span is smaller than X. Combine this span with the next span to form a new span. The new span includes all the symbols in the slot from the first symbol of the earliest span to the last symbol of the next span.
 c) Update the set of spans by removing the two spans and including the new span in the set.
 d) Update L to be the number of spans in the set of spans
End while
Step-5: For l=1, ..., L, define the l-th super span, SP, to be equal to the l-th span.

BD/CCE limit determination: Once the above method has given the set F of super-spans on the virtual cell, BD/CCE candidates may be distributed across a set of spans contained in a super-span $SP_l\Gamma$ across the active DL BPW(s) of the scheduling cells. This may result in the following specification: For a super-span $SP_L$, the UE is not required to monitor more than $C_{PDCCH}^{total,(X,Y),\mu}$ non-overlapping CCEs and more than $M_{PDCCH}^{total,(X,Y),\mu}$ PDCCH candidates for any set of spans across the active DL BWP(s) of scheduling cell(s) from the $N_{cells,r16}^{DL,(X,Y),\mu}$ downlink cells with at most one span per scheduling cell for each set, where the spans are contained in super-span $SP_i$.

Taking FIG. 2M as an example, the final set of super-spans on the virtual cell includes L=5 super-spans, $SP_1=\{1, 2, 3, 4\}$, $SP_2=\{5,6\}$, $SP_3=\{7,8\}$, $SP_4=\{9,10\}$ and $SP_5=\{12, 13\}$. For the first super-span $SP_1$ there are four spans across the cells: two spans on CC1, one span on CC2 and one span on CC3. What the UE is expected to monitor in these spans is shown in FIG. 2M with the two equations. For $SP_2$, $SP_3$, $SP_4$ or $SP_5$ there is exactly one span on each cell within the super-span.

In some embodiments, Problem 2 may be addressed using either of two possible methods to define UE behavior when a BWP is switched for the case of span-based PDCCH monitoring. The following embodiments provide the two behaviors corresponding to these two possibilities.

In one embodiment, which may be referred to as Embodiment 7, switching to an invalid BWP may be treated as an error case. If, on a serving cell, the UE is configured with Rel-16 (span-based) PDCCH monitoring for an active BWP, the UE is not expected to be instructed to switch to a new BWP with a configuration for which span-based PDCCH monitoring cannot be applied (invalid BWP configuration). For example, a BWP configuration with SCS of 60, 120 or 240 kHz may be an invalid BWP configuration for span-based PDCCH monitoring. It may be seen that Embodiment 7 makes it an error case for the UE to be configured with span-based PDCCH monitoring for a cell and an invalid configuration for the active BWP of the cell.

As an alternative behavior, the UE can be provided with a fallback operation in case of switching to an invalid BWP. In such an embodiment, which may be referred to as Embodiment 8, a fallback UE behavior for switching to an invalid BWP is defined. If the UE is configured with span-based PDCCH monitoring on a serving cell with an active BWP configuration applicable to span-based PDCCH monitoring, and if the UE is instructed to switch to a new BWP and the new BWP configuration is invalid for span-based PDCCH monitoring, the UE falls back to slot-based PDCCH monitoring on the new BWP. This is equivalent to the network reconfiguring the cell with slot-based PDCCH monitoring. An example may be a circumstance with a serving cell with SCS=15 kHz configured with span-based PDCCH monitoring on the active BWP, in which the network indicates to the UE to switch to a new BWP with an SCS configuration of 120 kHz. After switching to the new BWP, the UE no longer performs span-based PDCCH monitoring, and instead the UE performs the PDCCH monitoring based on slot.

As mentioned above, if a UE is configured only with $N_{cells,r16}^{DL,\mu}$ downlink cells for which the UE is provided monitoringCapabilityConfig-r16=r16monitoringcapability and with associated PDCCH candidates monitored in the active DL BWPs of the scheduling cell(s) using SCS configuration μ, and with $N_{cells,r16}^{DL,(X,Y),\mu}$ downlink cells using combination (X, Y) for PDCCH monitoring, where $\Sigma_{\mu=0}^{1} N_{cells,r16}^{DL,\mu} > N_{cells}^{cap-r16}$, a DL BWP of an activated cell is the active DL BWP of the activated cell, and a DL BWP of a deactivated cell is the DL BWP with index provided by firstActiveDownlinkBWP-Id for the deactivated cell, the UE is not required to monitor more than $$M_{PDCCH}^{total,(X,Y),\mu} = \left\lfloor N_{cells}^{cap-r16} \cdot M_{PDCCH}^{max,(X,Y),\mu} \cdot N_{cells,r16}^{DL,(X,Y),\mu} \bigg/ \sum_{j=0}^{1} N_{cells,r16}^{DL,j} \right\rfloor$$

PDCCH candidates or more than $$C_{PDCCH}^{total,(X,Y),\mu} = \left\lfloor N_{cells}^{cap-r16} \cdot C_{PDCCH}^{max,(X,Y),\mu} \cdot N_{cells,r16}^{DL,(X,Y),\mu} \bigg/ \sum_{j=0}^{1} N_{cells,r16}^{DL,j} \right\rfloor$$

non-overlapped CCEs, either (i) per set of spans on the active DL BWP(s) of all scheduling cell(s) from the $N_{cells,r16}^{DL,(X,Y),\mu}$ downlink cells, if a first condition holds or (ii) per set of spans across the active DL BWP(s) of all scheduling cells from the $N_{cells,r16}^{DL,(X,Y),\mu}$ downlink cells, with at most one span per scheduling cell for each set of spans, if the first condition does not hold, where $N_{cells,r16}^{DL,j}$ is a number of configured cells with SCS configuration j. The first condition holds if and only if the union of PDCCH monitoring occasions on all scheduling cells from the $N_{cells,r16}^{DL,(X,Y),\mu}$ downlink cells results to PDCCH monitoring according to the combination (X,Y) and any pair of spans in the set is within Y symbols, where first X symbols start at a first symbol with a PDCCH monitoring occasion and next X symbols start at a first symbol with a PDCCH monitoring occasion that is not included in the first X symbols. The first condition holds if the span pattern is an aligned span pattern.

In the above, the determination of monitoring capability depends on whether the first condition holds or not. As such, the UE may, in operation, check whether the first condition holds. The first condition involves the union of PDCCH MOs, as discussed above, an example of an aligned span pattern (i.e., a span pattern for which the first condition holds) is illustrated, for example, in FIG. 2H. Since the PDCCH MOs may vary from slot to slot, whether the span pattern is an aligned span pattern (i.e., whether the first condition holds) may also vary from slot to slot, and the corresponding PDCCH monitoring capability determination may vary from slot to slot. In some embodiments, all slots of a set of slots (e.g., a set of as many as 2560 slots of the SS configuration) may be defined to be unaligned if at least one slot within the set of slots is unaligned, i.e., if at least one slot of the set of slots does not satisfy the first condition. Such a definition, however may increase the processing burden imposed on a UE since only one slot may be unaligned out of large number of slots, and it may therefore be necessary for the UE to check a large number of slots (i.e., all of the slots in the set of slots) before processing any slot of the set of slots. In some embodiments, this processing burden may be alleviated by instead defining all slots to be unaligned only if every slot is unaligned (i.e., only if for each slot of the set of slots the first condition does not hold). While this method does reduce the burden on the UE, it also puts considerable restrictions on the network configuration.

In other embodiments, the processing burden imposed on a UE may be alleviated if, when any one of the slots of the set of slots is unaligned, unaligned slots occur with relatively high frequency. For example, the processing burden imposed on a UE may be alleviated if the network is required to send either (i) a search space configuration in which all of the slots are aligned (contain aligned span patters), or (ii) a search space configuration in which at least one in every P slots is unaligned, where P is a relatively small number, e.g., a number between 3 and 100 (e.g., P=10). If the UE is able to assume that the network will comply with such a requirement, then the UE need only check any P (e.g., any 10) consecutive slots to determine whether the first condition holds, for the entire set of slots.

In the current 3GPP specification (38.331), the periodicity of MOs may be as large as 2560 slots. In some embodiments, to reduce the burden on the UE, the network is required to send a search space configuration in which, when any of the slots does not satisfy the first condition (i.e., any slot is unaligned), at least M slots out of every N consecutive slots are unaligned. Alternatively, this behavior may be tied to slot index. For example, the network may be required to send a search space configuration in which, when any of the slots is unaligned, at least M slots out of every N slots, starting from a slot with an index N1 satisfying (N1 mod N)=0 and ending at a slot with an index N2 satisfying (N2 mod N)=N−1, are unaligned. The duration of a slot depends on subcarrier spacing, and the frequency of unaligned slots may alternatively be described with an absolute amount time such as 10 ms or 1 radio frame length. In this case, the network may be required to send a search space configuration in which, when any of the slots in the search space configuration is unaligned, at least M slots out of every T are unaligned, where T is an interval of time (e.g., in ms). Alternatively, this behavior can be tied to certain time indexes, such as subframe index which is indexed every 1 ms, radio frame index which is indexed every 10 ms etc. For example, the network may be required to send a search space configuration in which, when any of the slots in the SS configuration is unaligned, at least M slots in every radio frame are unaligned. In some embodiments, to significantly reduce the burden on the UE, N and T are considerably smaller than 2560, and than the duration of 2560 slots, respectively.

Figure 3A:
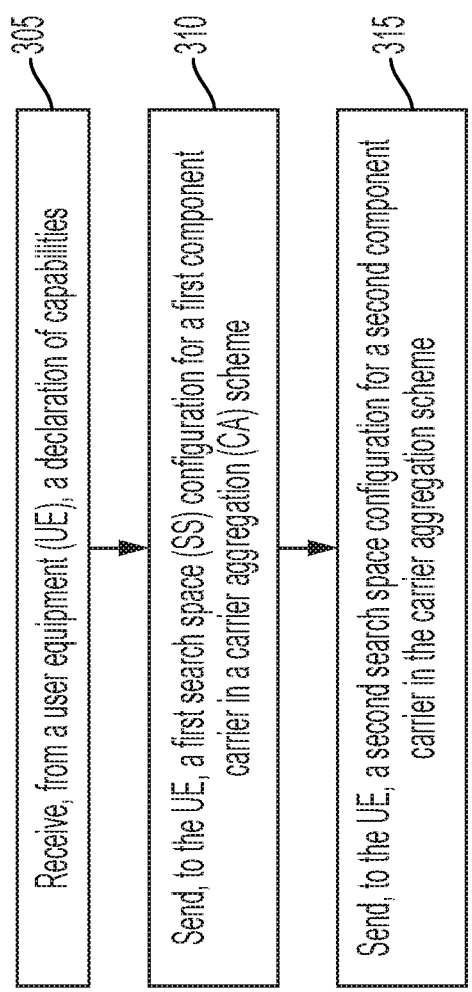
FIG. 3A is a flow chart, according to an embodiment of the present disclosure.
Figure 3B:
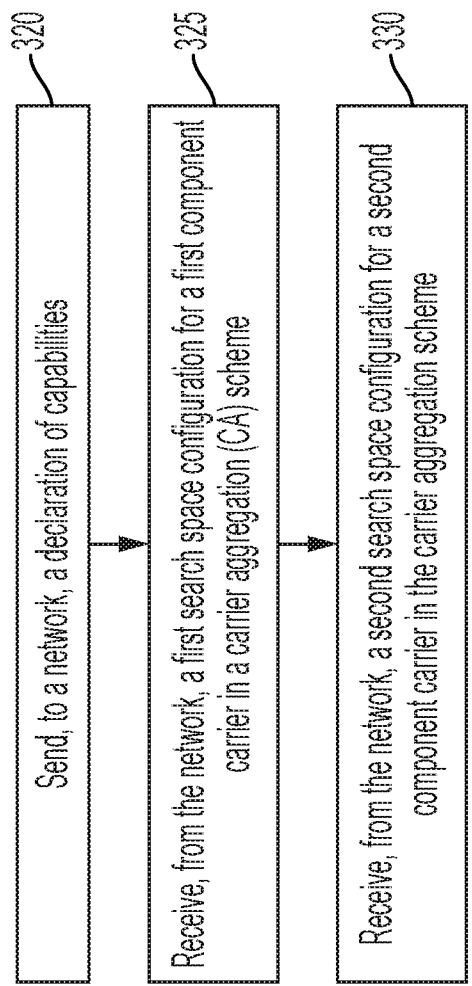
FIG. 3B is a flow chart, according to an embodiment of the present disclosure.

In some embodiments in which a network is in communication with a UE, methods as outlined in FIG. 3A (from the perspective of the network) and FIG. 3B (from the perspective of the UE), may be performed. Referring to FIG. 3A, the network may: receive, at 305, from the UE, a declaration of capabilities of the UE; send, at 310, to the UE, a first search space (SS) configuration for a first component carrier in a carrier aggregation (CA) scheme; and send, at 315, to the UE, a second search space configuration for a second component carrier in the carrier aggregation (CA) scheme. Referring to FIG. 3B, the UE may: send, at 320, to the network, a declaration of capabilities; receive, at 325, from the network, a first search space configuration for a first component carrier in the carrier aggregation (CA) scheme; and receive, at 330, from the network, a second search space configuration for a second component carrier in the carrier aggregation (CA) scheme.

As used herein, an "aligned span pattern" corresponding to a plurality of sets of monitoring occasions is either (i) a plurality of span patterns, each of which corresponds to a respective set of monitoring occasions and all of which are aligned with each other according to a definition of one of the embodiments disclosed herein, or (ii) a span pattern corresponding to the union of the sets of monitoring occasions (i.e., corresponding to a virtual cell configured with the union of the sets of monitoring occasions). As used herein, an "aligned slot" is a slot in which the span pattern is an aligned span pattern, an "unaligned span pattern" is a span pattern that is not an aligned span pattern, and an "unaligned slot" is a slot in which the span pattern is an unaligned span pattern.

As used herein, a "set" of things is one or more of the things, e.g., a set of control resource sets includes one or more control resource sets and a set of search spaces includes one or more search spaces. As used herein, "a portion of" something means "at least some of" the thing, and as such may mean less than all of, or all of, the thing. As such, "a portion of" a thing includes the entire thing as a special case, i.e., the entire thing is an example of a portion of the thing. As used herein, the word "or" is inclusive, so that, for example, "A or B" means any one of (i) A, (ii) B, and (iii) A and B.

The methods described herein may be performed by one or more processing circuits (e.g., a processing circuit of the network, or a processing circuit of the UE). Such processing circuits may be configured to send or receive data (e.g., through other elements, such as a radio transmitter or receiver). The term "processing circuit" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general-purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example, a processing circuit may include two processing circuits, an FPGA and a CPU, interconnected on a PCB.

As used herein, when a method (e.g., an adjustment) or a first quantity (e.g., a first variable) is referred to as being "based on" a second quantity (e.g., a second variable) it means that the second quantity is an input to the method or influences the first quantity, e.g., the second quantity may be an input (e.g., the only input, or one of several inputs) to a function that calculates the first quantity, or the first quantity may be equal to the second quantity, or the first quantity may be the same as (e.g., stored at the same location or locations in memory) as the second quantity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art. As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" or "between 1.0 and 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

Although exemplary embodiments of a system and method for setting blind detection and control channel element monitoring limits in a carrier aggregation scheme have been specifically described and illustrated herein, many modifications and variations will be apparent to those skilled in the art. Accordingly, it is to be understood that a system and method for setting blind detection and control channel element monitoring limits in a carrier aggregation scheme constructed according to principles of this disclosure may be embodied other than as specifically described herein. The invention is also defined in the following claims, and equivalents thereof.

What is claimed is:

1. A method, comprising:
    receiving, by a network from a first user equipment (UE), a declaration of capabilities of the first UE;
    sending, by the network, to the first UE, a first search space configuration for a first component carrier in a carrier aggregation scheme;
    sending, by the network, to the first UE, a second search space configuration for a second component carrier in the carrier aggregation scheme,
    wherein:
        the first search space configuration comprises a first set of monitoring occasions, and
        the second search space configuration comprises a second set of monitoring occasions;
    determining an (X, Y) pair that is satisfied by both the first set of monitoring occasions and the second set of monitoring occasions, wherein the (X, Y) pair is a feature 3-5b capability supported by the UE;
    determining a union of the first set of monitoring occasions and the second set of monitoring occasions;
    determining a span pattern based on the union;
    determining whether the (X, Y) pair is satisfied by the span pattern; and
        (i) implementing a first control channel elements (CCE) limit if the (X, Y) pair is satisfied by the span pattern; or
        (ii) implementing a second CCE limit different from the first CCE limit if the (X, Y) pair is not satisfied by the span pattern.

2. The method of claim 1, further comprising receiving, by the network from a second user equipment (UE), a declaration of capabilities of the second UE;
    sending, by the network, to the second UE, a third search space configuration for the first component carrier; and
    sending, by the network, to the second UE, a fourth search space configuration for the second component carrier,
    wherein:
        the third search space configuration defines a third set of monitoring occasions,
        the fourth search space configuration defines a fourth set of monitoring occasions, and
        the third set of monitoring occasions is not aligned with the fourth set of monitoring occasions.

3. The method of claim 2, wherein the third search space configuration includes at most $M_{PDCCH}^{total,(X,Y),\mu}$ physical downlink control channel (PDCCH) candidates, wherein $M_{PDCCH}^{total,(X,Y),\mu}$ is based on the declaration of capabilities of the second UE.

4. The method of claim 2, wherein the third search space configuration includes at most $C_{PDCCH}^{total,(X,Y),\mu}$ control channel elements, wherein $C_{PDCCH}^{total,(X,Y),\mu}$ is based on the declaration of capabilities of the second UE.

5. The method of claim 1, wherein:
    the declaration of capabilities of the first UE includes:
        a first span-gap span-length pair, and
        a second span-gap span-length pair; and the method further comprises:
  determining a first span pattern for the first span-gap span-length pair and for the first set of monitoring occasions, the first span pattern being the span pattern assuming the first span-gap span-length pair, that includes a first set of control resource sets and a first set of search spaces;
  determining that the first span pattern is valid for the first span-gap span-length pair;
  determining a second span pattern for the second span-gap span-length pair and for the first set of monitoring occasions, the second span pattern being the span pattern assuming the second span-gap span-length pair, that includes the first set monitoring occasions; and
  determining that the second span pattern is valid for the second span-gap span-length pair.

6. The method of claim 5, further comprising:
  determining that the first span-gap span-length pair corresponds to a first specified constant, the first specified constant specifying a maximum number of monitored physical downlink control channel (PDCCH) candidates; and
  determining that the second span-gap span-length pair corresponds to a second specified constant, the second specified constant specifying a maximum number of monitored PDCCH candidates, the second specified constant being greater than the first specified constant.

7. The method of claim 1 further comprising:
  determining that the first span-gap span-length pair corresponds to a first specified constant, the first specified constant specifying a maximum number of non-overlapping control channel elements; and
  determining that the second span-gap span-length pair corresponds to a second specified constant, the first specified constant specifying a maximum number of non-overlapping control channel elements, the second specified constant being greater than the first specified constant.

8. The method of claim 1, further comprising:
  instructing, by the network, the UE to transition to a bandwidth part not supporting span-based physical downlink control channel (PDCCH) monitoring, and
  sending, by the network, to the UE, a third search space configuration,
  the third search space configuration being a search space configuration for slot-based PDCCH monitoring.

9. A system comprising a network, the network comprising a processing circuit configured to:
  receive, from a first user equipment (UE), a declaration of capabilities of the first UE;
  send, to the first UE, a first search space configuration for a first component carrier in a carrier aggregation scheme;
  send, to the first UE, a second search space configuration for a second component carrier in the carrier aggregation scheme,
  wherein:
    the first search space configuration comprises a first set of monitoring occasions, and
    the second search space configuration comprises a second set of monitoring occasions;
  determine an (X, Y) pair that is satisfied by both the first set of monitoring occasions and the second set of monitoring occasions, wherein the (X, Y) pair is a feature 3-5b capability supported by the first UE;
  determine a union of the first set of monitoring occasions and the second set of monitoring occasions;
  determine a span pattern based on the union;
  determine whether the (X, Y) pair is satisfied by the span pattern; and
    (i) implement a first control channel elements (CCE) limit if the (X, Y) pair is satisfied by the span pattern; or
    (ii) implement a second CCE limit different from the first CCE limit if the (X, Y) pair is not satisfied by the span pattern.

10. The system of claim 9, wherein the processing circuit is further configured to:
  receive, from a second user equipment (UE), a declaration of capabilities of the second UE;
  send, to the second UE, a third search space configuration for the first component carrier; and
  send, to the second UE, a fourth search space configuration for the second component carrier,
  wherein:
    the third search space configuration defines a third set of monitoring occasions,
    the fourth search space configuration defines a fourth set of monitoring occasions, and
    the third set of monitoring occasions is not aligned with the fourth set of monitoring occasions.

11. The system of claim 10, wherein the third search space configuration includes at most $M_{PDCCH}^{total,(X,Y),\mu}$ physical downlink control channel (PDCCH) candidates, wherein $M_{PDCCH}^{total,(X,Y),\mu}$ is based on the declaration of capabilities of the second UE.

12. The system of claim 10, wherein the third search space configuration includes at most $C_{PDCCH}^{total,(X,Y),\mu}$ control channel elements, wherein $C_{PDCCH}^{total,(X,Y),\mu}$ is based on the declaration of capabilities of the second UE.

13. The system of claim 9, wherein:
  the declaration of capabilities of the first UE includes:
    a first span-gap span-length pair, and
    a second span-gap span-length pair; and
  the processing circuit is further configured to:
    determine a first span pattern for the first span-gap span-length pair and for the first set of monitoring occasions, the first span pattern being the span pattern assuming the first span-gap span-length pair, that includes a first set of control resource sets and a first set of search spaces;
    determine that the first span pattern is valid for the first span-gap span-length pair;
    determine a second span pattern for the second span-gap span-length pair and for the first set of monitoring occasions, the second span pattern being the span pattern assuming the second span-gap span-length pair, that includes the first set monitoring occasions; and
    determine that the second span pattern is valid for the second span-gap span-length pair.

14. The system of claim 13, wherein the processing circuit is further configured to:
  determine that the first span-gap span-length pair corresponds to a first specified constant, the first specified constant specifying a maximum number of monitored physical downlink control channel (PDCCH) candidates; and
  determine that the second span-gap span-length pair corresponds to a second specified constant, the second specified constant specifying a maximum number of monitored PDCCH candidates, the second specified constant being greater than the first specified constant.

15. The system of claim 13, wherein the processing circuit is further configured to:
   determine that the first span-gap span-length pair corresponds to a first specified constant, the first specified constant specifying a maximum number of non-overlapping control channel elements; and
   determine that the second span-gap span-length pair corresponds to a second specified constant, the first specified constant specifying a maximum number of non-overlapping control channel elements, the second specified constant being greater than the first specified constant.

16. The system of claim 9, wherein the processing circuit is further configured to:
   instruct the UE to transition to a bandwidth part not supporting span-based physical downlink control channel (PDCCH) monitoring, and
   send, to the UE, a third search space configuration, the third search space configuration being a search space configuration for slot-based PDCCH monitoring.

* * * * *